United States Patent [19]

Yamaguchi et al.

[11] Patent Number: 5,376,615
[45] Date of Patent: Dec. 27, 1994

[54] COLOR-DEVELOPING COMPOSITIONS AND THEIR USE

[75] Inventors: Keizaburo Yamaguchi, Chiba; Yoshimitsu Tanabe; Kiyoharu Hasegawa, both of Yokohama; Akihiro Yamaguchi, Kamakura, all of Japan

[73] Assignee: Mitsui Toatsu Chemicals, Incorporated, Tokyo, Japan

[21] Appl. No.: 915,175

[22] Filed: Jul. 20, 1992

[30] Foreign Application Priority Data

Jul. 18, 1991 [JP] Japan .................. 3-178312
Feb. 14, 1992 [JP] Japan .................. 4-027613

[51] Int. Cl.⁵ ............................. B41M 5/20
[52] U.S. Cl. ......................... 503/216; 503/216; 524/503; 524/504; 524/508; 560/68; 560/71
[58] Field of Search ............ 106/21 R; 503/216; 524/503, 504, 508; 502/475, 477; 560/71, 68

[56] References Cited

U.S. PATENT DOCUMENTS

| | | | |
|---|---|---|---|
| 2,712,507 | 7/1955 | Green | 503/200 |
| 3,934,070 | 1/1976 | Kimura et al. | 503/210 |
| 3,983,292 | 9/1976 | Saito et al. | 503/212 |
| 4,046,941 | 9/1977 | Saito et al. | 428/323 |
| 4,687,869 | 8/1987 | Nachbur | 556/132 |
| 4,744,203 | 5/1988 | Brockwell et al. | 53/512 |
| 4,748,259 | 5/1988 | Nachbur | 556/132 |
| 4,754,063 | 6/1988 | Nachbur | 562/468 |
| 4,879,368 | 11/1989 | Botta et al. | 528/397 |
| 4,929,710 | 5/1990 | Scholl et al. | 528/305 |
| 4,997,874 | 3/1991 | Asano et al. | 524/503 |
| 5,023,366 | 6/1991 | Yamaguchi | 560/71 |

FOREIGN PATENT DOCUMENTS

0283924 9/1988 European Pat. Off. .

OTHER PUBLICATIONS

CA 113:142405m.
CA 113:77919r.

Primary Examiner—John Kight, III
Assistant Examiner—Richard Jones
Attorney, Agent, or Firm—Millen, White, Zelano, & Branigan

[57] ABSTRACT

A color-developing composition comprises a multivalent-metal-modified salicylic acid resin (Resin A) and a polycondensation resin (resin B) at a weight ratio of 90–30 to 10–70. Resin A is composed of 5–35 mole % of a structural unit (I) and 65–95 mole % of at least one structural unit (II) or 65–95 mole % of a coupled structural unit of at least one unit (II) and at least one unit (III) and has a weight-average molecular weight of 350–5,000. Resin B is composed of the unit (II) and/or the unit (III) and has a weight-average molecular weight of 350–5,000.

(I)

(II)

(Abstract continued on next page.)

ABSTRACT
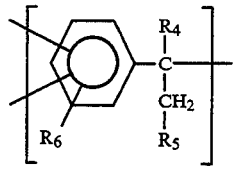
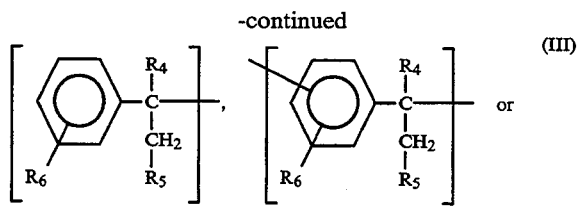 (III)
wherein Z represents M/m, M being a metal ion of m valence and m being an integer; $R_1$ and $R_2$ represent H or a $C_{1-12}$ alkyl, aralkyl, aryl or cycloalkyl group; $R_3$ and $R_6$ represent H or a $C_{1-4}$ alkyl group; and $R_4$ and $R_5$ represent H or $CH_3$.
9 Claims, 1 Drawing Sheet

COLOR-DEVELOPING COMPOSITIONS AND THEIR USE

BACKGROUND OF THE INVENTION

1. Field of the Invention

This invention relates to a novel color-developing composition comprising a multivalent-metal-modified salicylic acid resin, a color-developing sheet for pressure-sensitive copying paper sheets, said color-developing sheet having a layer of the color-developing composition, and also an aqueous suspension of the color-developing composition. In addition to pressure-sensitive copying paper sheets, the color-developing composition is also usable in heat-sensitive recording paper sheets, copying ink compositions, color-developing agents for transfer-type copying paper sheets, and the like.

2. Description of the Related Art

Pressure-sensitive copying paper sheets are also called "carbonless copying paper sheets". They produce a color by mechanical or impactive pressure, for example, by writing strokes or typewriter impression, thereby allowing the making of a plurality of copies at the same time. Among such pressure-sensitive copying paper sheets, there are those called "transfer type copying paper sheets", those called "self-contained copying paper sheets", etc. Their color-producing mechanisms are each based on a color-producing reaction between an electron-donating colorless dyestuff precursor and an electron-attracting color-developing agent.

In general, a pressure-sensitive copying paper sheet is formed of a sheet (CB-sheet), which is coated with microcapsules of a non-volatile organic solvent containing an electron-donating organic compound (pressure-sensitive dyestuff), and another sheet (CF-sheet), which is coated with an aqueous coating formulation containing an electron-attracting color-developing agent, with their coated sides maintained in a face-to-face contiguous relation. The microcapsules are ruptured by the above-described printing pressure, so that the pressure-sensitive dyestuff solution is caused to flow out into contact with the color-developing agent to develop a color. By changing The combination of a microcapsule layer, which contains a pressure-sensitive dyestuff, and a color-developing layer, it is possible to make a plurality of copies or to produce pressure-sensitive copying paper sheets capable of producing a color individually (SC-sheets).

Taking a pressure-sensitive copying paper of the transfer type by way of example, it will be described with reference to FIG. 1 which is a schematic cross-sectional view showing the structure of the illustrative pressure sensitive copying paper sheet.

The back sides of a CB-sheet 1 and CF/CB-sheet 2 are coated with microcapsules 4 which have diameters of several micrometers to somewhat greater than 10 micrometers and have been obtained by dissolving a colorless pressure-sensitive dyestuff precursor in a non-volatile oil and then encapsulating the resultant pressure-sensitive dyestuff precursor solution with high molecular films such as gelatin films. On the other hand, the front sides of the CF/CB-sheets 2 and a CF-sheet 3 are coated with a coating formulation containing a color-developing agent 5 which has properties such that upon contact with the pressure-sensitive dyestuff precursor, the color-developing agent 5 undergoes a reaction with the dyestuff precursor, thereby causing the dyestuff precursor to produce its color. In order to make copies, they are stacked in the order of the CB-sheet, (CF/CB-sheet) and CF-sheet with the sides coated with the dyestuff precursor maintained in contiguous relation with the sides coated with the color-developing agent. When a pressure is applied locally by a ball-point pen 6 or a typewriter, the capsules 4 are ruptured there. As a result, the solution containing the pressure-sensitive dyestuff precursor is transferred to the color-developing agent 5 so that one or more copied records are obtained.

Illustrative colorless or light-colored dyestuff precursors usable in such pressure-sensitive copying paper sheets include:

Triarylmethanephthalide compounds such as Crystal Violet lactone.

Fluoran compounds such as 3-dibutylamino-6-methyl-7-anilinofluoran.

Pyridylphthalide compounds.

Phenothiazine compounds.

Leucoauramine compounds.

One of more dyestuff precursors selected from these dyestuff precursors are dissolved in a hydrophobic high-boiling-point solvent and microencapsulated for use in the production of pressure-sensitive copying paper sheets.

As electron-attracting color-developing agents, there have been proposed (1) inorganic solid acids such as acid clay and attapulgite, as disclosed in U.S. Pat. No. 2,712,507; (2) substituted phenols and diphenols, as disclosed in Japanese Patent Publication No. 9309/1965; (3) p-substituted phenol-formaldehyde polymers, as disclosed in Japanese patent Publication No. 20144/1967; and (4) metal salts of aromatic carboxylic acids, as disclosed in U.S. Pat. No. 3,983,292 and Japanese Patent Publication Nos. 10856/1974, 1327/1977, etc. Some of them have already been employed actually.

Performance requirements which a color-developing sheet is supposed to satisfy include (1) high density of color marks produced at room temperature, (2) small density reduction of produced color marks during long-term storage, (3) high color-developing speed cf color marks especially at low temperatures, (4) reduced yellowing of paper surface during storage or upon exposure to radiant rays such as sunlight, (5) high resistance of produced color marks to disappearance or fading upon contact with water or a plasticizer and (6) high resistance of produced color marks to fading upon exposure to radiant rays such as sunlight.

Color-developing agents, which have been proposed to date, and sheets coated with such conventional color-developing agents have both advantages and disadvantages as will be described next.

1. Inorganic solid acids:

For example, inorganic solid acids are inexpensive but adsorb gas and moisture in the air during storage. They hence result in yellowing of paper surfaces and reduced color-producing performance. Color marks produced using inorganic solid acids undergo substantial fading when exposed to radiant rays such as sunlight.

2. Substituted phenols:

Substituted phenols have insufficient color-producing ability and produce color marks have a low color density. At low temperatures, the color-developing speed is low.

3. p-Substituted phenol-formaldehyde polymers:

p-Phenylphenol-novolak resins, which are primarily employed as p-substituted phenol-formaldehyde polymers, are excellent in the density of produced color marks, the color-developing speed at low temperatures and the resistance to water or a plasticizer, but paper sheets coated with them undergo yellowing and produced color marks become significantly faded upon exposure to radiant rays such as sunlight or during storage (especially, by nitrogen oxides in the air).

4. Metal salts of aromatic carboxylic acids:

As color-developing agents capable of improving the drawbacks of conventional color-developing agents, some metal salts of aromatic carboxylic acids, especially metal salts of salicylic acid derivatives have been proposed.

4-1. Mixtures containing a metal salt of 3,5-di($\alpha$-methylbenzyl)salicylic acid These mixtures include, for example, (i) mixtures of metal salts of 5-[$\alpha$-methyl-4'-($\alpha$-methylbenzyl)-benzyl]-salicylic acid and metal salts of 3,5-di($\alpha$-methylbenzyl)-salicylic acid, said mixtures being disclosed in Japanese Patent Laid-Open Nos. 100493/1986, 084045/1987 and 096449/1987 and being available from salicylic acid and phenyl ethanols or styrenes; and (ii) mixtures of metal salts of 3-$\alpha$-methylbenzyl-5-(1,3-diphenylbutyl)salicylic acid and metal salts of 3,5-di($\alpha$-methylbenzyl)salicylic acid, said mixtures being disclosed in Japanese Patent Laid-Open Nos. 91042/1990 and 91043/1990 and being available from salicylic acid, styrene and derivatives thereof.

A color-developing agent obtained from salicylic acid compounds in accordance with any one of these proposed preparation processes generally comprises a mixture of two components from which resin components other than the salicylic acid component have been extracted out. Mixtures of such salicylic acid derivatives contain a metal salt of 3,5-di($\alpha$-methylbenzyl)salicylic acid, said metal salt being disclosed in U.S. Pat. No. 3,983,292 referred to above and have been employed actually, and the other salicylic acid component is a compound either identical or close in molecular weight to the 3,5-di($\alpha$-methylbenzyl)salicylic acid.

When these color-developing agents are used in copying or recording paper sheets, the coated paper surfaces are imparted with improved yellowing resistance, but the low-temperature color-developing ability, water or plasticizer resistance, light fastness and the like, which have heretofore been considered to present problems, are still not considered to have been improved.

4-2. Mixtures of a salicylic acid compound and a resin compatible therewith

With a view toward improving light fastness or water or plasticizer resistance, (iii) Japanese Patent Publication No. 1195/1980 proposes to use a salicylic acid compound in admixture with a resin compatible therewith. Such a method is certainly effective for the improvement of waterproofness and light fastness but is still insufficient with respect to the color-developing speed at low temperatures, the density of color marks produced at low temperatures and long-term stability.

Effects of a salicylic acid compound as a color-developing agent are dependent on its substituent group or groups. Therefore, color-developing ability is generally low even when a mere metal salicylate is used in combination with a compatible resin. Introduction of at least one aromatic substituent group into the skeleton of salicylic acid is therefore an essential requirement for salicylic compounds to be used in accordance with such a method. It has been pointed out, however, that 3,5-di($\alpha$-methylbenzyl)salicylic acid known as a compound containing an aromatic substituent introduced into the skeleton of salicyclic acid is expensive because it is prepared by a high-temperature and high-pressure reaction.

4-3. Metal-modified salicylic acid resins

In attempts to improve the low-temperature color-developing ability and the water or plasticizer resistance, some methods have been proposed in recent years to resinify salicylic acid and to use its metal-modified products.

Examples of such attempts include (iv) metal-modified polybenzylsalicylic acids obtained from salicylic acid and benzyl halides, as disclosed in Japanese Patent Laid-Open No. 132857/1988; (v) metal-modified salicylic acid resins obtained from salicylic acid and styrenes, as disclosed in Japanese Patent Laid-Open No. 112537/1988; and (vi) metal-modified salicylic resins formed from salicylic acids and various benzyl derivatives, as proposed by the present inventors in Japanese Patent Laid-Open No. 186729/1988, Japanese Patent Laid-Open No. 254124/1988, Japanese Patent Laid-Open No. 289017/1988, Japanese Patent Laid-Open No. 56724/1989 and Japanese Patent Laid-Open No. 77575/1989.

It is stated as an advantage that the low-temperature color-developing speed and waterproofness are generally improved to significant extents when these metal-modified salicylic acid resins are used as color-developing agents.

The above-exemplified, multivalent-metal-modified salicylic resins are not considered to contain any compatible, organic high-molecular weight compounds. It is, therefore, still difficult to say that such color-developing agents have sufficiently solved the problems in light fastness and long-term storage stability of produced color marks.

To produce a pressure-sensitive copying paper sheet by using a color-developing agent, the color-developing agent is generally wet-ground in the presence of a surfactant so that the color-developing agent is formed as fine particles having a particle size of 1–10 $\mu$m into an aqueous suspension. Upon formation of the suspension, a dispersant is also used. The selection of a combination of particles to be dispersed and a dispersant for the provision of a good dispersion system practically relies upon experiences in many instances, and there is no general rule therefor. When a dispersant is chosen, it is necessary to take into account not only its dispersing ability but also its interaction with dispersed particles. For example, for phenol-formaldehyde condensation products which have been employed as color-developing agents in pressure-sensitive copying paper sheets, an anionic high molecular weight surfactant of the polycarboxylic acid type, specifically the sodium salt of maleic anhydridediisobutylene copolymer is usually used as a dispersant. However, if this dispersant is used upon formation of the color-developing composition, which comprises the above-described multivalent-metal-modified salicylic acid resin, into an aqueous suspension, a complex is inconveniently formed between the multivalent metal and the carboxylic acid salt. This results in a substantial reduction in the dispersing ability and dispersion stability, production of hardly defoamable foams, changes in the physical properties of the color-developing agent due to modifications of the multivalent-metal-modified salicylic acid resin as a dispersoid, etc. It is therefore impossible to obtain any practically usable aqueous suspension. Salts of naphthalenesulfonic acid-formaldehyde condensation products, salts of ligninsulfonic acid, and the like—which were previously employed for color-developing agents of the phenol-formaldehyde condensation products—include those capable of showing dispersing ability for color-developing compositions comprising a multivalent-metal-modified salicylic acid resin. When they are employed in pressure-sensitive copying paper sheets, the pressure-sensitive copying paper sheets are accompanied by drawbacks such as coloration, light yellowing or the like of the paper surfaces due to the dispersants themselves so that such dispersants substantially lack practical utility.

It is accordingly not easy to combine a color-developing composition, which comprises the above-described multivalent-metal-modified salicylic acid resin, with a suitable dispersant into an aqueous suspension having good quality in various properties such as dispersibility, stability and color-developing ability.

SUMMARY OF THE INVENTION

A first object of this invention is to provide a color-developing agent which can be prepared at low cost and can provide a color-developing sheet capable of producing color marks with satisfactory waterproofness, plasticizer resistance, light fastness and long-term stability and exhibiting satisfactory color-developing ability at low temperatures.

A second object of this invention is to provide a color-developing sheet for a pressure-sensitive copying paper sheet, said color-developing sheet being provided with a layer of the color-developing agent.

A third object of this invention is to provide an aqueous suspension which is good in dispersion, storage stability, coating stability and the like, and can be used extremely conveniently for the production of pressure-sensitive copying paper sheets. It is also an object of this invention to provide an aqueous suspension which enables the production of high-quality pressure-sensitive copying paper sheets which are excellent in stability of produced color marks (light fastness, waterproofness, solvent resistance, writing instrument resistance, plasticizer resistance) and free from quality variations during storage, such as coloration or light yellowing of the paper surfaces.

The present inventors have carried out an extensive investigation with a view toward attaining the above-described various objects. As a result, it has been found that combined use of a multivalent-metal-modified salicylic acid resin and a polycondensation resin free of any salicylic acid component as a color-developing composition makes it possible to provide a color-developing sheet capable of producing color marks with improved waterproofness, plasticizer resistance, light fastness and long-term stability and exhibiting improved color-developing ability at low temperatures, leading to the completion of the invention.

In one aspect of the present invention, there is thus provided a color-developing composition comprising a multivalent-metal-modified salicylic acid resin (Resin A) and a polycondensation resin (B) at a weight ratio of 90–30 to 10–70, said Resin A being composed of 5–35 mole % of a structural unit (I) and 65–95 mole % of at least one structural unit (II) or 65–95 mole % of a coupled structural unit of at least one structural unit (II) and at least one structural unit (III) and having a weight-average molecular weight of 350–5,000; said Resin B being composed of the structural unit (II) and/or the structural unit (III) and having a weight-average molecular weight of 350–5,000; and said structural units (I), (II) and (III) being represented by the following formulae (I), (II) and (III), respectively:

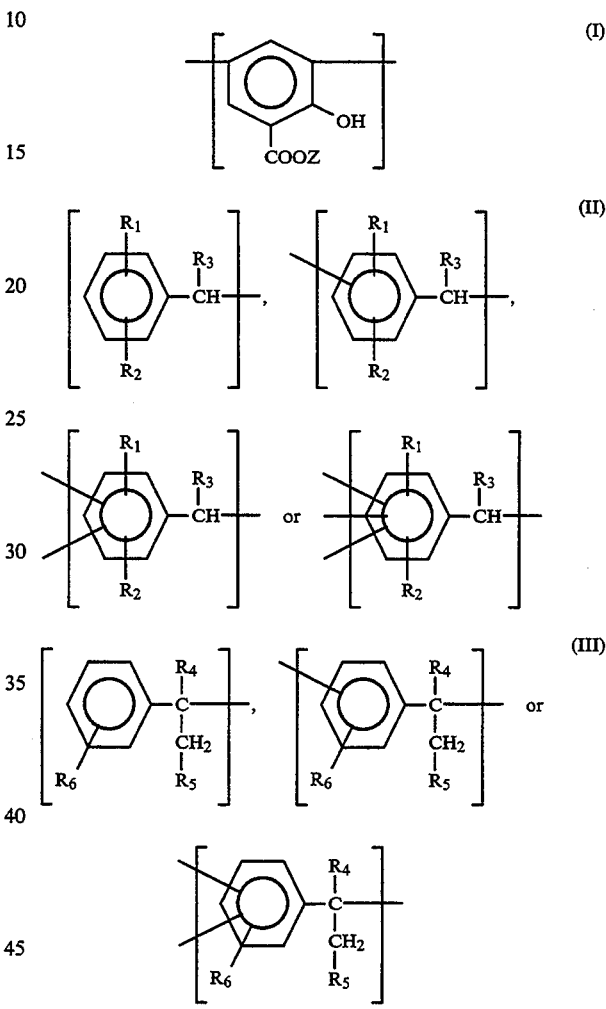

wherein Z represents M/m, M being a metal ion of m valence and m being an integer; $R_1$ and $R_2$ represent a hydrogen atom or a $C_{1-12}$ alkyl, aralkyl, aryl or cycloalkyl group; $R_3$ and $R_6$ represent a hydrogen atom or a $C_{1-4}$ alkyl group; and $R_4$ and $R_5$ represent a hydrogen atom or a methyl group.

In a further aspect of this invention, there is also provided an aqueous suspension of a color-developing composition comprising a multivalent-metal-modified salicylic acid resin. The aqueous suspension has been prepared by finely wet-grinding the above color-developing composition in the presence of at least one anionic, water-soluble, high molecular substance selected from the group consisting of:
  a) polyvinyl alcohol derivatives containing at least one sulfonic acid group in the molecules thereof, and salts thereof; and
  b) polymers and copolymers containing as an essential component a styrenesulfonic acid salt represented by the following formula (IV):

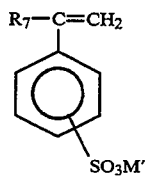

(IV)

wherein $R_7$ means a hydrogen atom or an alkyl group having 1-5 carbon atoms and $M'$ denotes $Na^+$, $K^+$, $Cs^+$, $Fr^+$ or $NH_4^+$.

In a still further aspect of the invention, there is also provided a color-developing sheet for a pressure sensitive copying paper sheet. The color-developing sheet is obtained by coating a wood free paper web with a water-base coating formulation making use of the above aqueous suspension.

Compared with color-developing sheets using an inorganic solid acid or p-phenylphenol novolak resin, the color-developing sheet, which makes use of the multivalent-metal-modified salicylic acid resin obtained in accordance with this invention, has either comparable or better color producing ability, has been improved in the yellowing resistance of the coated paper surfaces to a considerable extent especially in the yellowing resistance to nitrogen oxides in the air, and is extremely advantageous in handling ease and storage.

Compared with metal salts of salicylic acid compounds typical as metal salts of aromatic carboxylic acid, on the other hand, water- and plasticizer-resistance, light fastness and long-term stability of produced color marks and the color-producing ability at low temperatures have been improved substantially. It is, therefore, possible to provide useful color-developing agents at lower cost.

BRIEF DESCRIPTION OF THE DRAWING

The above and other objects, features and advantages of the present invention will become apparent from the following description of the invention and the appended claims, taken in conjunction with the accompanying sole drawing, in which:

DETAILED DESCRIPTION OF THE INVENTION AND PREFERRED EMBODIMENTS

Figure 1:
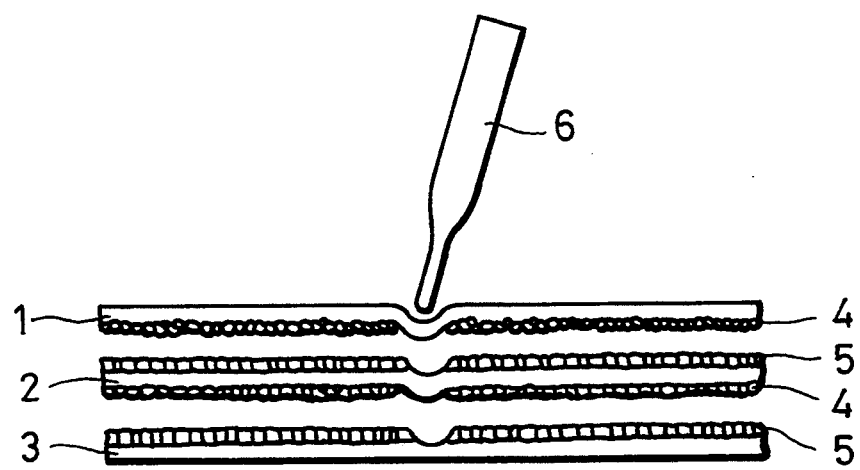
FIG. 1 is a schematic cross-sectional view showing the structure of a pressure-sensitive copying paper sheet.

A characteristic feature of the color-developing composition according to this invention resides in that, in a multivalent-metal-modified salicylic acid resin, a polycondensation resin free of any salicylic acid component is contained in a range of 10-70wt. % of the whole resin weight.

Such a color-developing composition can be obtained by mixing a salicylic acid resin—which has been obtained by a first-stage reaction (I) in which a benzyl compound is reacted to a salicylic acid or by another first-stage reaction (II) in which a styrene is reacted further to the resin composition obtained through the first-stage reaction (I)—with a polycondensation resin (resin B) and then reacting the resultant mixture with a multivalent metal salt in a second-stage reaction. As an alternative process, the color-developing composition can also be obtained by mixing a resin (resin A)—which has been obtained through a second-stage reaction in which the salicylic acid resin obtained in the first-stage reaction (I) or (II) is reacted with a multivalent metal salt—with the polycondensation resin (resin B).

It is also feasible to intentionally cause the polycondensation resin to exist in the first-stage reaction (I) and/or (II) for the production of the salicylic acid resin.

The ratio of the polycondensation resin component (resin B) to the metal-modified salicylic acid component (resin A) in the resin composition of this invention is in a range of 30-90/70-10 by weight ratio.

If the ratio of the polycondensation resin component to the metal-modified salicylic acid resin component is greater than the upper limit of the above range, the resulting color-developing sheet is lowered substantially in the color-producing performance and the intended light fastness and the long-term stability of produced color marks are impaired conversely. If the ratio is smaller than the lower limit, the light fastness and the long-term stability of produced color marks are reduced despite good color-producing performance.

With respect to such polycondensation resins, the advantages available from their combined use with multivalent-metal-modified salicylic acid resins have not been recognized at all to date. Namely, the production processes disclosed in connection with multivalent-metal-modified salicylic acid resins do not include any method for intentionally producing a polycondensation resin for its utilization but rather include methods for the elimination of such a polycondensation resin.

For example, Japanese Patent Laid-Open Nos. 100493/1986 and 84045/1987 include a step in which a resin component free of any salicylic acid component is extracted out. This means that any polycondensation resin is eliminated in such a step.

Owing to the mixture of such a polycondensation resin at a suitable level in the color-developing agent of this invention, the performance as a copying or recording sheet such as the light fastness and long-term stability of produced color marks has been rendered more preferable.

The advantages available from such a polycondensation resin are believed to be attributed to the fact that the polycondensation resin acts not only as an extender or as a means for enhancing the compatibility with a dye or oil in microcapsules but also acts as an absorber for ultraviolet rays which decompose the color-produced dye.

On the other hand, Japanese Patent Publication No. 1195/1980 discloses a process in which a salicylic acid is mixed with a resin having compatibility with the resin. Although its object is to improve the waterproofness, this patent publication also discloses, as an additional advantage, the prevention of fading of produced color marks by water because the salicylic acid compound itself is somewhat water-soluble.

The multivalent-metal-modified salicylic acid resin (resin A) according to the present invention is by itself of fully satisfactory level in color-developing performance and waterproofness. The combined use of the polycondensation resin at an appropriate level, however, has made it possible to further enhance the light fastness and the long-term stability of produced color marks.

A detailed description will next be made of a process for the production of the color-developing agent according to this invention.

According to the first-stage reaction (I), salicylic acid is condensed in the presence of an acid catalyst with at least one benzyl derivative represented by the formula (V)

wherein $R^1$, $R_2$ and $R_3$ mean the atom or group defined above in equations (II), and Y denotes a halogen atom or $OR_7$, $R_7$ being a hydrogen atom or a $C_{1-4}$ alkyl group, or

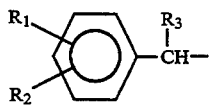

wherein $R_1$, $R_2$ and $R_3$ have the same meanings as described above.

Specific usable examples of the benzyl derivative represented by the formula (V) include:
(1) benzyl ethers,
(2) benzyl alcohols,
(3) mixtures of benzyl alcohols and benzyl ethers, and
(4) benzyl halides.

Use of the benzyl derivatives 1) to 4) will hereinafter be described in detail.

(1) Condensation between salicylic acid and benzyl ethers

This is the case that, in the formula (V), Y is $OR_7$ with the proviso that $R_7$ is other than H.

Benzyl ethers can introduce a benzyl group into a certain type of aromatic compound. It is known to use, for example, benzyl propyl ether in order to introduce a benzyl group into benzene, naphthalene, phenol or the like ["Jikken Kagaku Koza", 18(II), 84 (1956), Maruzen].

However, the reactions between salicylic acid and benzyl ethers, said reactions being useful in the practice of this invention, were previously found by the present inventors (Japanese Patent Laid-Open No. 77575/1989).

The benzyl ethers are used in an amount of 1–5 moles, preferably 1.5–3 moles of benzyl groups per mole of salicylic acid.

In this reaction, the reaction temperature must be 80° C. or higher. Any temperatures lower than 80° C. lead to an extremely slow reaction velocity and, moreover, greater possibility of side reactions such as esterification reactions. A temperature range of about 100° C.–240° C. is desired for shortening the reaction time as much as possible. The reaction time may range from 1 hour to 20 hours. As an acid catalyst, an inorganic or organic acid, especially, a mineral acid, for example, hydrochloric, phosphoric or sulfuric acid, or formic acid may be used. Alternatively, a Friedel-Crafts catalyst such as zinc chloride, stannic chloride or ferric chloride or an organic sulfonic acid such as methanesulfonic acid or p-toluenesulfonic acid may be used either singly or in combination. Such a catalyst may be used in an amount of about 0.01–20 wt. %, preferably 0.5–5 wt. % of the total amount of salicylic acid and the benzyl ether.

As a common process for producing the salicylic acid resin, salicylic acid, a benzyl ether and a catalyst in predetermined amounts may be added at once and are then heated to conduct their reaction at a predetermined temperature. The reaction may also be conducted while a portion of the benzyl ether is added dropwise to the mixture. An alcohol (or water), which is formed as the reaction proceeds, is trapped out of the reaction system. The alcohol (or water), which still remains in a small amount in the reaction system, is taken out of the reaction system by nitrogen gas if necessary.

After completion of the reaction, the contents are taken out of the reactor and then cooled, whereby the intended resin is obtained. When the molar ratio of the benzyl ether is made low to obtain a resin of comparatively low molecular-weight, unreacted salicylic acid remains in the resin. It can be removed by washing the resin with warm water or by dissolving the resin in an organic solvent such as benzene, toluene, monochlorobenzene, methyl isobutyl ketone or cyclohexanone and then washing same with warm water.

Examples of the benzyl ether include benzyl alkyl ethers, α-alkylbenzyl alkyl ethers and dibenzyl ethers.

Benzyl alkyl ethers are represented by the above formula (V) wherein $R_3$ is a hydrogen atom and Y is $OR_7$, $R_7$ being a $C_{1-4}$ alkyl group. When the carbon number of each alkyl group in $R_7$ is 4 or smaller under the above reaction conditions, the reaction proceeds fast, no esterification reaction occurs and a good salicylic acid resin can be obtained with ease. Among alkyl groups having 4 carbon atoms, i.e., butyl groups, the tertbutyl group tends to lead to a slow reaction.

Accordingly, examples of of the benzylalkyl ether capable of affording a resin in the first stage reaction include, but are not limited to, benzyl methyl ether, benzyl ethyl ether, benzyl isopropyl ether, benzyl-n-butyl ether, o-methylbenzyl methyl ether, o-methylbenzyl ethyl ether, o-methylbenzyl isobutyl ether, m-methylbenzyl methyl ether, m-methylbenzyl ethyl ether, m-methylbenzyl isopropyl ether, p-methylbenzyl methyl ether, p-methylbenzyl ethyl ether, p-methylbenzyl-n-propyl ether, p-methylbenzyl isopropyl ether, p-methylbenzyl-n-butyl ether, p-methylbenzyl-sec-butyl ether, p-methylbenzyl isobutyl ether, o-ethylbenzyl methyl ether, o-ethylbenzyl ethyl ether, o-ethyl benzyl isopropyl ether, p-ethylbenzyl methyl ether, p-ethylbenzyl ethyl ether, p-ethylbenzyl isopropyl ether, p-ethylbenzyl-n-butyl ether, o-isopropylbenzyl ethyl ether, p-isopropylbenzyl ethyl ether, p-n-propylbenzyl ethyl ether, p-tert-butyl-benzyl ethyl ether, p-tert-butylbenzyl isopropyl ether, p-tert-octylbenzyl ethyl ether, p-nonylbenzyl methyl ether, p-dodecylbenzyl methyl ether, p-phenylbenzyl methyl ether, o-phenylbenzyl isopropyl ether, p-cyclohexylbenzyl ethyl ether, p-(α-methylbenzyl)benzyl methyl ether, p-(α-methylbenzyl)benzyl ethyl ether, p-(α,α-dimethylbenzyl)benzyl methyl ether, 2,3-dimethylbenzyl methyl ether, 2,4-dimethylbenzyl methyl ether, 2,5-dimethylbenzyl methyl ether, 2,6-dimethylbenzyl methyl ether, 3,4-dimethylbenzyl methyl ether, 3,5-dimethylbenzyl methyl ether, 2,4-diethylbenzyl methyl ether, 3,4-dimethylbenzyl ethyl ether, 3,5-dimethylbenzyl ethyl ether, 2,4-diethylbenzyl methyl ether, 2,3-dimethylbenzyl isopropyl ether, 2,4-dimethylbenzyl-n-propyl ether, 3,4-dimethylbenzyl-n-butyl ether, 2,4-dimethylbenzyl-sec-butyl ether, 3,5-dimethylbenzyl-n-amyl ether, 2,4-diethylbenzyl methyl ether, 3,5-diethylbenzyl isopropyl ether, 2,3-diethylbenzyl-n-butylether, 2,4-diisopropylbenzyl methyl ether, 3,5-diisopropylbenzyl ethyl ether, 3-methyl-4-ethylbenzyl methyl ether, 3-methyl-5-tert-butylbenzyl methyl ether and 2-methyl-4-(α-methylbenzyl)benzyl methyl ether.

The α-alkylbenzyl alkyl ether is represented by the formula (V) wherein $R_3$ is a $C_{1-4}$ alkyl group and Y is $OR_7$, $R_7$ being a $C_{1-4}$ alkyl group. Similar to the benzyl alkyl ether, when the carbon number of each alkyl group in $R_7$ is 4 or smaller, the reaction proceeds fast, no esterification reaction occurs and a good salicylic acid resin can be obtained. Among alkyl groups having 4 carbon atoms, i.e., butyl groups, the tertbutyl group tends to lead to a slow reaction.

Industrially preferred as $R_3$ are methyl and ethyl groups.

Accordingly, examples of α-alkylbenzylalkyl ether capable of affording a resin in the first stage reaction, include, but are not limited to, include α-methylbenzyl methyl ether, α-methylbenzyl ethyl ether, α-methylbenzyl isopropyl ether, α-methylbenzyl-n-propyl ether, α-methylbenzyl-n-butyl ether, α-ethylbenzyl methyl ether, α-ethylbenzyl ethyl ether, α-ethylbenzyl isopropyl ether, α-ethylbenzyl-n-butyl ether, α-n-propylbenzyl methyl ether, α-isopropyl benzyl ethyl ether, α-n-butylbenzyl isopropyl ether, o-methyl-α-methylbenzyl methyl ether, p-methyl-α-methylbenzyl methyl ether, m-methyl-α-methylbenzyl methyl ether, p-methyl-α-methylbenzyl ethyl ether, p-methyl-α-methylbenzyl isopropyl ether, p-methyl-α-methylbenzyl-n-propyl ether, p-methyl-α-methylbenzyl-n-butyl ether, p-methyl-α-ethylbenzyl methyl ether, p-methyl-α-ethylbenzyl ethyl ether, p-methyl-α-ethylbenzyl isopropyl ether, p-methyl-α-ethylbenzyl-n-butyl ether, o-methyl-α-ethylbenzyl methyl ether, o-methyl-α-ethylbenzyl isopropyl ether, m-methyl-α-ethylbenzyl methyl ether, p-methyl-α-methylbenzyl methyl ether, o-ethyl-α-ethyl-benzyl ethyl ether, m-ethyl-α-n-propylbenzyl methyl ether, p-isopropyl-α-methylbenzyl methyl ether, o-isopropyl-α-methylbenzyl methyl ether, p-sec-butyl-α-methylbenzyl methyl ether, p-tert-butyl-α-methylbenzyl methyl ether, p-nonyl-α-methylbenzyl methyl ether, p-dodecyl-α-methylbenzyl methyl ether, p-phenyl-α-methylbenzyl methyl ether, o-phenylbenzyl-α-methyl-benzyl methyl ether, p-cyclohexyl-α-methylbenzyl methyl ether, p-(α-methylbenzyl)-α-methylbenzyl methyl ether, p-(α,α-dimethylbenzyl)-α-methylbenzyl methyl ether, 2,3-dimethyl-α-methylbenzyl methyl ether, 2,4-dimethyl-α-methylbenzyl methyl ether, 2,5-dimethyl-α-methyl-benzyl methyl ether, 2,6-dimethyl-α-methylbenzyl methyl ether, 3,4-dimethyl-α-methylbenzyl methyl ether, 3,5-dimethyl-α-methylbenzyl methyl ether, 2,3-dimethyl-α-methylbenzyl ethyl ether, 2,4-dimethyl-α-methylbenzyl isopropyl ether, 2,5-dimethyl-α-methylbenzyl-n-propyl ether, 2,6-dimethyl-α-methylbenzyl-n-butyl ether, 3,4-dimethyl-α-methylbenzyl-sec-butyl ether, 2,3-dimethyl-α-ethylbenzyl methyl ether, 2,4-dimethyl-α-ethylbenzyl methyl ether, 2,5-dimethyl-α-ethylbenzyl ethyl ether, 2,6-dimethyl-α-ethylbenzyl-n-propyl ether, 3,4-dimethyl-α-ethylbenzyl isopropyl ether, 3,5-dimethyl-α-ethylbenzyl-n-butyl ether, 2,4-dimethyl-α-propylbenzyl methyl ether, 2,4-diethyl-α-methylbenzyl methyl ether, 2,5-diethyl-α-methylbenzyl methyl ether, 3,4-diethylbenzyl-α-ethylbenzyl methyl ether, 3,5-diethylbenzyl-α-propylbenzyl isopropyl ether, 2,4-diisopropyl-α-methyl-benzyl methyl ether, 2,4-diisopropyl-α-ethylbenzyl methyl ether, 2,6-diisopropyl-α-propylbenzyl methyl ether, 3,5-diisopropyl-α-butylbenzyl methyl ether, 2-methyl-4-ethyl-α-methylbenzyl methyl ether, 2-methyl-4-tert-butyl-α-methylbenzyl methyl ether, 2-methyl-4-(α-methylbenzyl)-α-methylbenzyl methyl ether and 2-methyl-4-(α,α-dimethylbenzyl)-α-methylbenzyl methyl ether. The present invention is however not necessarily limited to such illustrative α-alkylbenzylalkyl ethers.

The dibenzyl ethers are represented by the formula (V) wherein $R_3$ is a hydrogen atom or a $C_{1-4}$ alkyl group and Y is $OR_7$, $R_7$ being represented by the following formula:

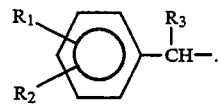

The molar ratio of the dibenzyl ether to salicylic acid is half of that of the benzyl ether employed in the above-described reaction conditions.

Exemplary dibenzyl ethers capable of affording a resin in the first stage reaction include, but are not limited to, dibenzyl ether, di(o-methylbenzyl) ether, di(m-methylbenzyl) ether, di(p-methylbenzyl) ether, di(o-ethylbenzyl) ether, di(m-ethylbenzyl) ether, di(p-ethylbenzyl) ether, di(o-isopropylbenzyl) ether, di(p-n-propylbenzyl) ether, di(p-tert-butylbenzyl) ether, di(p-nonylbenzyl) ether, di(o-phenylbenzyl) ether, di(p-cyclohexylbenzyl) ether, di[(p-benzyl)benzyl]-ether, di[p-(α-methylbenzyl)benzyl]ether, di[p-(α,α-dimethyl)benzyl]ether, di(2,3-dimethylbenzyl) ether, di(2,4-dimethylbenzyl) ether, di(2,5-dimethylbenzyl) ether, di(2,6-dimethylbenzyl) ether, di(3,4-dimethylbenzyl) ether, di(3,5-dimethylbenzyl) ether, di(2,4-diethylbenzyl) ether, di(3-ethyl-4-ethylbenzyl) ether, di[3-(α-methylbenzyl)-4-methylbenzyl]ether, di[2,5-(dimethylbenzyl)benzyl]ether, di(α-methylbenzyl) ether, di(α-ethylbenzyl) ether, di(α-n-propylbenzyl) ether, di(α-isopropylbenzyl) ether, di(α-n-butylbenzyl) ether, di(o-methyl-α-methylbenzyl) ether, di(p-methyl-α-methylbenzyl) ether, di(m-methyl-α-methylbenzyl) ether, di(p-methyl-α-ethylbenzyl) ether, di(p-methyl-α-isopropylbenzyl) ether, di(p-methyl-α-n-propylbenzyl) ether, di(p-methyl-α-n-butylbenzyl) ether, di(p-ethyl-α-methylbenzyl) ether, di(m-ethyl-α-ethylbenzyl) ether, di(o-ethyl-α-methylbenzyl) ether, di(p-isopropyl-α-methylbenzyl) ether, di(p-phenyl-α-methylbenzyl) ether, di[P-(α-methylbenzyl)-α-methylbenzyl]ether, di[p-(α,α-dimethylbenzyl)-α-methylbenzyl]ether, di(2,3-dimethyl-α-methylbenzyl]ether, di(2,4-dimethyl-α-methylbenzyl) ether, di(2,5-dimethyl-α-methylbenzyl) ether, di(3,4-dimethyl-α-methylbenzyl) ether and di(2-methyl-5-tert-butyl-α-methylbenzyl) ether. Among them, dibenzyl ether, di(p-methylbenzyl) ether, di(α-methylbenzyl) ether, di(p-methyl-α-methylbenzyl) ether are preferred.

(2) Condensation between salicylic acid and benzyl alcohols

This is the case that, in the formula (V), Y is $OR_7$ with $R_7$ being H.

It has been the common practice to obtain alkyl-substituted salicylic acids by reacting various alcohols for alkylation of salicylic acid. Several processes are known in this regard.

For example, isobutanol is reacted to salicylic acid to obtain tert-butylsalicylic acid ["Jikken Kagaku Koza", 18(II), 30 (1956), Maruzen], and 2 moles of phenylethanol are reacted to 1 mole of salicylic acid to obtain 5-[α-methyl-4′-(α-methylbenzyl)-benzyl]salicylic acid or the like (Japanese Patent Laid-Open Nos. 100493/1986 and 96449/1987).

These processes are all for the preparation of substituted salicylic acid compounds. Production of a salicylic acid resin by using an alcohol, as in the present invention, was found by the present inventors. According to the process of the present invention, benzyl alcohol or the like is caused to exist in an excess amount so that a co-condensation resin with salicylic acid is obtained.

Namely, the present inventors have found that, when benzyl alcohols are caused to exist in an amount of 2 moles or more per mole of salicylic acid and they are molten and reacted in the presence of an acid catalyst at a reaction temperature of 80° C. or higher, various benzyl groups can be introduced to the ortho positions and/or the para position relative to the hydroxyl group of salicylic acid and excess benzyl alcohols, while undergoing a self-condensation reaction, successively condense to the various benzyl groups introduced in the salicylic acid to form resinous matters. This condensation reaction is similar to the above-described reaction with benzyl ether except that water is formed instead of an alcohol as the reaction proceeds. Accordingly, the amount of benzyl alcohol to be used, reaction conditions, the average molecular weight of the resulting salicylic acid resin, the proportion of the salicylic acid component in the salicylic acid resin, etc. are the same as those described above under (1).

Examples of the benzyl alcohol capable of affording a resin in the first stage reaction (I) include, but are not limited to, benzyl alcohol, o-methylbenzyl alcohol, m-methylbenzyl alcohol, p-methylbenzyl alcohol, o-ethylbenzyl alcohol, m-ethylbenzyl alcohol, p-ethylbenzyl alcohol, o-isopropylbenzyl alcohol, p-n-propylbenzyl alcohol, p-tert-butylbenzyl alcohol, p-nonylbenzyl alcohol, o-phenylbenzyl alcohol, p-cyclohexylbenzyl alcohol, p-(benzyl)benzyl alcohol, p-(α-methylbenzyl)benzyl alcohol, p-(α,α-dimethyl)benzyl alcohol, 2,3-dimethylbenzyl alcohol, 2,4-dimethylbenzyl alcohol, 2,5-dimethylbenzyl alcohol, 2,6-dimethylbenzyl alcohol, 3,4-dimethylbenzyl alcohol, 3,5-dimethylbenzyl alcohol, 2,4-diethylbenzyl alcohol, 3-methyl-4-ethylbenzyl alcohol, 3-(α-methylbenzyl)-4-methylbenzyl alcohol, 2,5-(dimethylbenzyl)benzyl alcohol, α-methylbenzyl alcohol, α-ethylbenzyl alcohol, α-n-propylbenzyl alcohol, α-isopropylbenzyl alcohol, α-n-butylbenzyl alcohol, o-methyl-α-methylbenzyl alcohol, p-methyl-α-methylbenzyl alcohol, m-methyl-α-methylbenzyl alcohol, p-methyl-α-ethylbenzyl alcohol, p-methyl-α-isopropylbenzyl alcohol, p-methyl-α-n-propylbenzyl alcohol, p-methyl-α-n-butylbenzyl alcohol, p-ethyl-α-methylbenzyl alcohol, m-ethyl-α-ethylbenzyl alcohol, o-ethyl-α-methylbenzyl alcohol, p-isopropyl-α-methylbenzyl alcohol, p-phenyl-α-methylbenzyl alcohol, p-(α-methylbenzyl)-α-methylbenzyl alcohol, p-(α,α-dimethylbenzyl)-α-methylbenzyl alcohol, 2,3-dimethyl-α-methylbenzyl alcohol, 2,4-dimethyl-α-methylbenzyl alcohol, 2,5-dimethyl-α-methylbenzyl alcohol, 3,4-dimethyl-α-methylbenzyl alcohol and 2-methyl-5-tert-butyl-α-methylbenzyl alcohol. Among them, benzyl alcohol, p-methylbenzyl alcohol, α-methylbenzyl alcohol and p-methyl-α-methylbenzyl alcohol are preferred.

As has been described above, resins of the first-stage reaction (I) can be obtained by condensation of salicylic acid with various benzyl alcohols or various benzyl ethers. Mixtures of these benzyl derivatives can also be used.

In particular, a mixture of a benzyl alcohol and a dibenzyl ether can be obtained by hydrolysis of a benzyl halide. A description will next be made of such a mixture.

(3) Condensation between salicylic acid and benzyl halide hydrolyzates

A mixture of a benzyl alcohol of the formula (V) in which Y is OH and a dibenzyl ether of the formula (V) in which Y is:

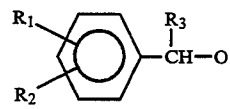

can be obtained by hydrolyzing a benzyl halide of the formula (V), in which Y is a halogen atom, with an aqueous solution of the hydroxide, carbonate or bicarbonate of an alkali metal or alkaline earth metal. Potassium hydroxide, sodium hydroxide, lithium hydroxide, calcium hydroxide, magnesium hydroxide, potassium carbonate, sodium carbonate, calcium carbonate, magnesium carbonate, potassium bicarbonate, sodium bicarbonate or the like is used in an amount of at least 1 mole, preferably 1–10 moles or so per mole of the benzyl halide.

The concentration of the alkali compound in the aqueous solution is 1–40 wt. %, preferably 3–20 wt. %. The proportion of the dibenzyl ether in the above mixture tends to become higher as the concentration of the alkali compound increases. In contrast, the proportion of the benzyl alcohol in the above mixture tends to become higher as the concentration of the alkali compound decreases.

Besides the concentration of the aqueous solution, the composition of the mixture also varies depending on the kind of the alkali compound. For example, use of a strongly alkaline hydroxide such as potassium hydroxide or sodium hydroxide results in a higher proportion of the dibenzyl ether compared with use of a relatively mild alkaline salt such as sodium carbonate or sodium bicarbonate.

The reaction temperature in the above hydrolytic reaction can range from room temperature to 100° C. or so. The hydrolytic reaction may be conducted at a higher temperature under pressure in some instances, so that the reaction can be accelerated. The reaction time is 1–40 hours, usually 5–20 hours. Although the reaction is usually conducted without any organic solvent, an organic solvent inert to the reaction may be used.

To accelerate the reaction, a phase transfer catalyst such as crown ether, cryptate, a quaternary ammonium or a quaternary phosphonium salt can be used.

After completion of the reaction, the reaction mixture is left over so that the reaction mixture is separated into phases. The oil phase is collected to obtain a mixture of a benzyl alcohol and a dibenzyl ether. The mixture can be used as it is, although the mixture can be distilled for further purification. The ratio of the benzyl alcohol to the dibenzyl ether, which are obtained by the above-described process, is in a range of from 1:99 to 99:1 (by weight).

The amounts of the mixture, which has been obtained as described above and consists of the benzyl alcohol and the dibenzyl ether, and salicylic acid to be used upon condensation of the raw materials as well as reaction conditions for the condensation are the same as in the above cases (1) and (2).

(4) Condensation between salicylic acid and benzyl halides

Describing this reaction in detail, a benzyl halide of the formula (V) in which Y is a halogen atom is reacted with a salicylic acid in the presence of a Friedel-Crafts catalyst collectively explained above as an acid catalyst, whereby a co-condensation resin is obtained.

It has been found that, when the benzyl halide is caused to exist in an amount of at least 2 moles per mole of salicylic acid and they are then reacted at a reaction temperature of 20° C. or higher in the presence of a Friedel-Crafts catalyst, various benzyl groups can be introduced into the ortho positions and/or the para position relative to the hydroxyl group of the salicylic acid and the excess benzyl halide, while undergoing a self-condensation reaction, successively condenses to the various benzyl groups introduced into salicylic acid to have a resinous form.

Examples of the halogen of the benzyl halide include chlorine, bromine and fluorine, with chlorine being preferred.

Examples of the benzyl halide include, but are not limited to, benzyl chloride, benzyl bromide, o-methylbenzyl chloride, m-methylbenzyl chloride, p-methylbenzyl chloride, o-ethylbenzyl chloride, m-ethylbenzyl chloride, p-ethylbenzyl chloride, o-isopropylbenzyl chloride, p-n-propylbenzyl chloride, p-tert-butylbenzyl bromide, p-nonylbenzyl chloride, o-phenylbenzyl fluoride, p-cyclohexylbenzyl chloride, p-(benzyl)benzyl chloride, p-(α-methylbenzyl)benzyl chloride, p-(α,α-dimethyl)benzyl chloride, 2,3-dimethylbenzyl fluoride, 2,4-dimethylbenzyl chloride, 2,5-dimethylbenzyl chloride, 2,6-dimethylbenzyl chloride, 3,4-dimethylbenzyl chloride, 3,5-dimethylbenzyl dichloride, 2,4-diethylbenzyl chloride, 3-methyl- 4-ethylbenzyl chloride, 3-(α-methylbenzyl)-4-methylbenzyl chloride, 2,5-(dimethylbenzyl)benzyl chloride, α-methylbenzyl chloride, α-ethylbenzyl bromide, α-isopropylbenzyl chloride, α-n-butylbenzyl chloride, o-methyl-α-methylbenzyl chloride, p-methyl-α-methylbenzyl chloride, m-methyl-α-methylbenzyl chloride, p-ethyl-α-methylbenzyl chloride, o-ethyl-α-methylbenzyl chloride, p-isopropyl-α-methylbenzyl chloride, p-phenyl-α-methylbenzyl chloride, p-(α-methylbenzyl)-α-methylbenzyl chloride, p-(α,α-dimethylbenzyl)-α-methylbenzyl chloride, 2,3-dimethyl-α-methylbenzyl chloride, 2,4-dimethyl-α-methylbenzyl chloride, 2,5-dimethyl-α-methylbenzyl chloride, 3,4-dimethyl-α-methylbenzyl chloride and 2-methyl-5-tert-butyl-α-methylbenzyl chloride. Among them, benzyl chloride, p-methylbenzyl chloride, α-methylbenzyl chloride and p-methyl-α-methylbenzyl chloride are preferred.

Upon production of the resin in the first stage reaction (I), the benzyl halide may be used in an amount of 1-5 moles, preferably 1.5-3 moles per mole of salicylic acid.

Examples of the catalyst usable in this reaction include Lewis acids such as ferric chloride, zinc chloride, aluminum chloride, stannic chloride, titanium tetrachloride and boron trifluoride; super strong acids such as perfluoroalkanesulfonic acids, e.g., trifluoromethanesulfonic acid; and perfluoroalkanesulfonic acid resins, e.g., "Nafion H" (trade name; product of E. I. Du Pont de Nemours & Co., Inc.). Among them, zinc chloride is particularly preferred. The catalyst may be used in an amount of 0.05-200 mole %, preferably 1-100 mole % per mole of salicylic acid in view of economy.

The first stage reaction (I) may be conducted using a solvent. Illustrative usable solvents include those inert to the reaction, specifically ethyl ether, ethylene glycol dimethyl ether, methylene chloride, 1,2-dichloroethane, acetic acid, propionic acid, carbon disulfide and nitromethane.

These solvents are used, in view of economy, in an amount 30 times (by volume/by weight) or less the total weight of the reaction raw materials.

The reaction temperature of the first stage reaction (I) is in a range of from 20° C. to 180° C., preferably from 50° C. to 160° C. The reaction time ranges from 1 hour to 30 hours.

To produce the salicylic acid resin in the first stage reaction (I), it is general to charge all the raw materials at once and then to heat and react them at a predetermined temperature or to charge salicylic acid and a catalyst and then to add a benzyl halide, the other raw material, dropwise to the resultant mixture so as to react them at a predetermined temperature. Here, it is preferable to control the dropping time to at least 50% of the entire reaction time. The dropping time usually ranges from 1 hour to 20 hours.

The salicylic acid resin obtained by the first-stage reaction (I) can be subjected to the second-stage reaction in which the salicylic acid resin is reacted with a multivalent metal salt either after mixing with a polycondensation resin or as it is. As an alternative, the salicylic acid resin can be processed as described above after it is washed first with a solvent and then with water and is then separated into phases.

When the first-stage reaction (II) is conducted further on the resin obtained in the first-stage reaction (I), the reaction product of the first-stage reaction (I) can be subjected directly to the first-stage reaction (II) by continuously using the catalyst employed in the first-stage reaction (I) where the first-stage reaction (I) is conducted without any solvent or where the catalyst is in a very small amount. When the catalyst employed in the first-stage reaction (I) is not used in the first-stage reaction (II), the reaction mixture is dissolved in a water-immiscible solvent, followed by the addition of water. The resultant mixture is washed with water and is then allowed to separate into two phases. The catalyst is dissolved in the water layer and is hence removed. Where a solvent is employed, the reaction mixture of the first-stage reaction (I) is similarly subjected, as it is, to the first-stage reaction (II) or, after the catalyst is removed by washing or the like, the second-stage reaction (II) is conducted by another catalyst.

The first-stage reaction (II) is next conducted by reacting a styrene derivative, which is represented by the following formula (VI):

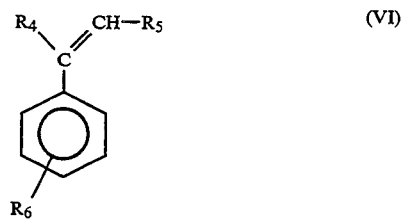

(VI)

wherein $R_4$, $R_5$ and $R_6$ mean the atom or group defined above with respect to the formula (III), in the presence of a strong acid catalyst.

In the above reaction, the $\alpha$ position of the styrene derivative benzylates each aromatic substituent group of the salicylic acid resin obtained in the above first-stage reaction (I), that is, the $\alpha$ position of the styrene derivative reacts to a benzene ring other than the skeleton of salicylic acid.

Further, an excess styrene reacts to the benzene ring of a styrene derivative bonded to each aromatic substituent group of the salicylic acid resin, resulting in an increased molecular weight.

Illustrative of the styrene derivative employed in the first stage reaction (II) include, but are not limited to, styrene, o-methylstyrene, m-methylstyrene, p-methylstyrene, o-ethylstyrene, p-ethylstyrene, o-isopropylstyrene, m-isopropylstyrene, p-isopropylstyrene, p-tert-butylstyrene, $\alpha$-methylstyrene and $\beta$-methylstylene. Industrially preferred is styrene for its low price.

The styrene derivative may be used in an amount of 0.2–20 moles, preferably 0.5–10 moles per salicylic acid in the resin obtained in the first stage reaction (I).

The first stage reaction (II) uses a strong acid catalyst.

Usable examples of the strong acid catalyst include mineral acids such as hydrochloric acid, sulfuric acid and phosphoric acid; Friedel-Crafts catalysts such as ferric chloride, zinc chloride, aluminum chloride, stannic chloride, titanium tetrachloride and boron trifluoride; and strong acid catalysts such as methanesulfonic acid and trifluoromethanesulfonic acid. Among these, particularly preferred is sulfuric acid for its low price. The catalyst is used in an amount of 0.05–200 wt. %, preferably 1–100 wt. % in view of economy, both based on the whole weight of the salicylic acid resin, which has been obtained in the first stage reaction (I), and the styrene derivative.

The first stage reaction (II) can be conducted using a solvent. Illustrative usable solvents include those inert to the reaction, specifically aliphatic hydrocarbons such as n-hexane, n-heptane, n-pentane and cyclohexane; ethers such as ethyl ether and ethylene glycol dimethyl ether; esters such as ethyl acetate and butyl acetate; halogenated hydrocarbons such as methylene chloride, 1,2-dichloroethane, 1,1,2-trichloroethane, carbon tetrachloride, chloroform and monochlorobenzene; organic acids such as acetic acid and propionic acid; ketones such as acetone and methyl ethyl ketone; carbon disulfide; nitromethane; acetonitrile; and tetrahydrofuran.

These solvents are used, in view of economy, in an amount 30 times (by volume/by weight) or less the total weight of the reaction raw materials.

The reaction temperature upon conducting the first stage reaction (II) is in a range of from $-20°$ C. to $180°$ C., preferably from $0°$ to $120°$ C. The reaction time ranges from 1 hour to 30 hours.

The first stage reaction (II) can be conducted generally by charging the catalyst in a solution of the salicylic acid resin, which has been obtained in the first stage reaction (I), in an organic solvent and then reacting the other raw material, i.e., the styrene derivative at a predetermined temperature while adding the styrene derivative dropwise. Here, it is preferable to control the dropping time to at least 50% of the entire reaction time. The dropping time usually ranges from 1 hour to 20 hours. Where the solvent employed in the reaction is insoluble in water, water is added after the reaction so that the reaction mixture is washed with water in two layers. The resulting mixture is allowed to separate into two layers and the solvent is distilled off to obtain the resin. Where the solvent is soluble in water, the reaction mixture is poured into water so that the resin is allowed to deposit for collection.

The salicylic acid resin in the reaction product so obtained comprises 5–35 mole % of a structural unit (I) and 65–95 mole % of a structural unit (II) or a coupled structural unit of the unit (II) and the unit (III). The multivalent-metal-modified product of the salicylic acid resin (Resin A) has a weight-average molecular weight of 350–5,000.

A description will next be made of the polycondensation resin (resin B).

The polycondensation resin according to this invention comprises at least one structural unit (II) and/or at least one structural unit (III). Where two or more of these structural units are contained, the polycondensation resin can be either a mere physical mixture or a composition in which two or more structural units are reacted and coupled together.

Examples of such a resin include condensation products of one or more of the various benzylating agents employed in the first-stage reaction (I), nucleus or side chain polymers of one or more of the styrene derivatives used in the first-stage reaction (II), copolycondensation products of at least one of the various benzylating agents used in the first-stage reaction (I) and at least one of the styrene derivatives used in the first-stage reaction (II), and mixtures of these three types of resins. In the compositions of these polycondensation resins, the components of each copolycondensation product or mixture composed of two or more raw material components can be chosen at a desired ratio.

The weight average molecular weight of such a polycondensation resin (resin B) is in a range of 350–5,000.

When such a polycondensation resin is used as a color-developing composition of this invention, it is the common practice to produce it separately from the resin (A) and then to mix them together for use. The polycondensation resin can however be byproduce intentionally upon production of the resin (A). It is also possible to produce a resin of the structural unit (II) and/or the structural unit (III) without addition of salicylic acid in the reaction of the resin (A) and then to allow the resin to exist and to react it upon production of a salicylic acid resin.

When the polycondensation resin (B) and the resin (A), produced separately, are mixed, it is common to heat, melt and mix them together after the first-stage reaction. This has the advantage that the process can be immediately moved to the second-stage reaction. Alternatively, the resin (A) and the resin (B) can be molten and mixed after the completion of the second-stage reaction for the resin (A).

A description will next be made of the second stage reaction. The second stage reaction is to form the salicylic acid resin, which is contained in the above resin composition, into a multivalent-metal-modified salt. In order to produce a multivalent-metal-modified salt of the salicylic acid resin, which has been produced as described above, by the second stage reaction, several known methods can be used. For example, it can be produced by reacting an alkali metal salt of the salicylic acid resin with a water-soluble multivalent-metal salt in water or in a solvent in which the alkali metal salt and the multivalent-metal salt are both soluble. Namely, an alkali metal hydroxide, carbonate, alkoxide or the like is reacted with the resin to obtain a solution of the alkali metal salt of the resin in water, an alcohol or a water-alcohol mixture, followed by the reaction with the water-soluble multivalent-metal salt to produce the multivalent-metal-modified resin.

Namely, a multivalent-metal salt of the salicylic acid resin can be obtained as a precipitate by dispersing the salicylic acid resin in an aqueous solution, alcohol solution or water-alcohol solution which contains the hydroxide or carbonate or an alkoxide of an alkali metal in an amount at least equivalent to the carboxyl groups in the salicylic acid resin, dissolving the resin at 0°–100° C., and then adding and reacting at 0°–100° C. a water-soluble multivalent-metal salt either as is or in the form of an aqueous solution, alcohol solution or water-alcohol solution to the solution of the salicylic acid resin. It is desirable to react the water-soluble multivalent-metal salt in an amount of about 0.5–1 gram equivalent based on the carboxyl groups in the salicylic acid.

In this method, a multivalent-metal salt of the salicylic acid resin is often mixed with the resin B, which has been separately prepared, in a molten state A molten mixture containing a multivalent-metal salt of the salicylic acid resin can be produced by mixing the salicylic acid resin, which contains a polycondensation resin component, with a multivalent-metal salt of an organic carboxylic acid such as formic acid, acetic acid, propionic acid, valeric acid, caproic acid, stearic acid or benzoic acid, heating, melting and reacting the resultant mixture, and then cooling the same. In some instances, they may be heated, molten and reacted after adding a basic substance, for example, ammonium carbonate, ammonium bicarbonate, ammonium acetate or ammonium benzoate further.

The multivalent-metal-modified salicylic acid resin can also be produced by using the salicylic acid resin, which contains a polycondensation resin component, and a multivalent-metal carbonate, oxide or hydroxide, heating and melting the resultant mixture to react the same, and then cooling the reaction mixture. Here, they can be reacted after adding a basic substance such as the ammonium salt of an organic carboxylic acid, for example, ammonium formate, ammonium acetate, ammonium caproate, ammonium stearate or ammonium benzoate further.

When the metal-modified salicylic acid resin containing a polycondensation resin component is produced by heating and melting the reactants, the reaction temperature generally ranges from 100° C. to 180° C. and the reaction time ranges from about 1 hour to about several hours although the reaction time varies depending on the composition of the resin, the reaction temperature, and the kind and amount of the multivalent-metal salt employed. As the multivalent-metal salt, it is desirable to use an organic carboxylate of a multivalent metal and/or the carbonate, oxide and/or hydroxide of the multivalent metal in an amount such that the multivalent metal will be contained in a proportion of from 1 wt. % to about 20 wt. % based on the total weight of the salicylic acid containing a polycondensation resin component.

No particular limitation is imposed on the amount of the basic substance to be used. However, it is generally used in an amount of 1–15 wt. % based on the whole weight of the salicylic acid resin containing a polycondensation resin component. When the basic substance is used, it is more preferable to use it after mixing it with the multivalent-metal salt.

The softening point of the metal-modified resin—which contains the polycondensation resin component and has produced in accordance with any one of the various heating and melting processes described above—ranges from 50° C. to 120° C. (as measured by the ring and ball softening point measuring method set out under JIS-K-2548).

Exemplary metals in the metal-modified salicylic acid resin of the invention, said resin containing a polycondensation resin component, include metals other than alkali metals such as lithium, sodium and potassium. Preferred multivalent metals include, for example, calcium, magnesium, aluminum, copper, zinc, tin, barium, cobalt and nickel. Of these, zinc is particularly effective. Each of these multivalent metals forms a multivalent-metal salt with carboxyl groups in the same molecule or different molecules of the salicylic acid resin.

The color-developing agent of this invention may be used in combination with one or more known color-developing agents, namely, in combination with one or more of inorganic solid acids such as activated clay, organic polymers such as phenol-formaldehyde resin, and metal salts of aromatic carboxylic acid without any problems or inconvenience.

The color-developing agent of this invention may also be used in combination with at least one of the oxides, hydroxides and carbonates of multivalent metals selected from the group consisting of zinc, magnesium, aluminum, lead, titanium, calcium, cobalt, nickel, manganese and barium.

As a method for the fabrication of a color-developing sheet for a pressure-sensitive copying paper sheet by using the multivalent-metal-modified salicylic acid resin containing a polycondensation resin component, any one of the following methods can be employed: (1) to apply a water-base coating formulation, which makes use of an aqueous suspension of the metal-modified resin, to a base material such as a paper web; (2) to incorporate the metal-modified resin in a base paper web when the base paper web is produced; and (3) to prepare a coating formulation by using a solution or suspension of the metal-modified resin in an organic solvent and then to coat a base material with the coating formulation.

Upon preparation of a coating formulation, kaolin clay or its analogous clay, calcium carbonate, starch, synthetic or natural latex, etc. are added to obtain the coating formulation with suitable viscosity and coating applicability. The proportion of the color-developing agent in the coating formulation is preferably 10–70% of the whole solids. If the proportion of the color-developing agent is smaller than 10%, it is impossible to exhibit sufficient color-producing ability. Any proportions greater than 70% result in color-developing sheets having poor paper surface characteristics. The coating formulation is applied at a rate of 0.5 g/m$^2$ or more, preferably 1–10 g/m$^2$ in terms of dry weight.

Compared with color-developing sheets using an inorganic solid acid or a p-phenylphenol novolak resin, the color-developing sheet, which makes use of the novel color-developing agent of this invention, has either comparable or better color producing ability, has been improved in the yellowing problem upon exposure to sunlight, has been improved to a considerable extent especially in the yellowing resistance to nitrogen oxides in the air, and is extremely advantageous in handling ease and storage.

Compared with color-developing sheets using a metal salt of a salicylic acid compound typical as metal salts of aromatic carboxylic acid, on the other hand, the color-developing sheet according to this invention has been improved in the following points which conventional color-developing sheets using an aromatic carboxylate have as defects:

(a) insufficient compatibility with a nonvolatile oil containing a color former dissolved therein,
(b) slight solubility in water,
(c) fading of colored marks under light, and
(d) high cost.

Compared with a color-developing sheet obtained using a metal salt of a resinified salicylic acid, that using the color-developing agent of the present invention has also been improved in the light fastness and long-term stability of produced color marks. The present invention, therefore, makes it possible to provide at low cost a useful color-developing composition in which various defects of the conventional color-developing sheets have been overcome.

A description will next be made of the aqueous suspension of this invention.

The aqueous suspension of the present invention is obtained by forming a color-developing composition—which comprises a multivalent-metal-modified salicylic acid resin having good color-developing ability and the like-into an aqueous suspension by using a dispersant especially suitable for the metal-modified salicylic acid resin and having excellent characteristics. The aqueous suspension of this invention can be used suitably for the fabrication of pressure-sensitive copying paper sheets. The pressure-sensitive copying paper sheets so obtained have been improved in color-producing performance and the like, and show extremely good performance.

Anionic water-soluble high molecular weight substances (a) and (b), which serve as dispersants in the present invention, will be described.

The anionic water-soluble high molecular weight substances (a) are polyvinyl alcohol derivatives having a sulfonic acid group in their molecules or salts of the derivatives. Their polymerization degrees are 200–5000, preferably 200–2000. The sulfonic group is generally employed in the form of an alkali metal salt ($Na^+$, $K^+$, $Cs^+$ or $Fr^+$) or the $NH_4^+$ salt. Illustrative processes for the production of the high molecular weight substances (a) include:

(1) Vinyl acetate and a sulfonic-acid-group-containing $\alpha,\beta$-unsaturated monomer are copolymerized, followed by saponification.
(2) Polyvinyl alcohol and concentrated sulfuric acid are reacted.
(3) Polyvinyl alcohol is subjected to oxidative treatment with bromine, iodine or the like, followed by reaction with acidic sodium sulfite.
(4) A sulfonic-acid-group-containing aldehyde compound is reacted with polyvinyl alcohol in the presence of an acid catalyst, so that a sulfoacetal is obtained.

Among the above processes, the process (1) is preferred.

Specific examples of the sulfonic-containing $\alpha,\beta$-unsaturated monomer employed in the process (1) include:

(i) sulfoalkyl (meth)acrylates, for example, sulfoethyl acrylate and sulfoethyl methacrylate;
(ii) vinylsulfonic acid, styrenesulfonic acid and allylsulfonic acid;
(iii) maleimido-N-alkanesulfonic acids;
(iv) 2-acrylamido-2-methylpropanesulfonic acid, 2-acrylamido-2-phenylpropanesulfonic acid.

The high molecular weight substances (a) can be produced generally by copolymerizing these monomers with vinyl acetate at a ratio of 0.5–20 moles, preferably 1–10 moles to 100 moles and then saponifying (50–100%) vinyl acetate groups under alkaline conditions in a manner known per se in the art.

The high molecular weight substances (a) can also be obtained each by copolymerizing an aromatic $\alpha,\beta$-unsaturated monomer such as styrene with vinyl acetate and, after sulfonation, saponifying the sulfonated copolymer. As a further alternative, the high molecular substances (a) can also be obtained each by copolymerizing an $\alpha,\beta$-unsaturated monomer, which contains a sulfonic acid group, or another $\alpha,\beta$-unsaturated monomer with vinyl acetate.

Representative examples of the anionic water-soluble high molecular weight substances (b), which are polymers or copolymers obtained using as an essential component the sulfonate represented by formula (IV), are polymers containing units of styrenesulfonic acid or a derivative thereof in the molecule thereof. Among these, polystyrenesulfonic acid salts and poly-$\alpha$-methylstyrenesulfonic acid salts having an average polymerization degree of 5–1000 can be mentioned as suitable examples. Such homopolymers can be synthesized in any desired way. Namely, salts of polystyrenesulfonic acid derivatives can be synthesized by sulfonating polystyrene or polymerizing styrenesulfonic acid (or its salts). As a polymerization process, a known process can be employed, for example, radical polymerization at 0°–150° C., ion polymerization or the like. Specific examples of high molecular substances (b) as copolymers include salts of copolymers of styrenesulfonic acid and maleic anhydride, sulfonate salts of copolymers of styrene and maleic acid, sulfonate salts of copolymers of styrene and other vinyl monomers.

A description will next be made of characteristic properties of the anionic water-soluble high molecular substances (a), (b) useful as dispersants in the present invention. Different from general polyvinyl alcohols of the completely saponified or partially saponified type, each high molecular substance (a) containing sulfonic groups has high solubility in water and is easily dissolved in water, undergoes small viscosity variations over a wide pH range, and is practically colorless or extremely light-colored. As a consequence, an aqueous suspension of the color-developing composition comprising the multivalent-metal-modified salicylic acid resin is colored very little. Use of this aqueous suspension can therefore provide pressure-sensitive copying paper sheets (CF-sheets) having a high degree of whiteness. As has been described above, each polyvinyl alcohol derivative containing sulfonic acid groups in its molecules has excellent dispersibility for the color-developing composition comprising the multivalent-metal-modified salicylic acid resin while the polyvinyl alcohol derivative itself has the characteristics that it is not modified in properties and color even under severe environmental conditions. The polyvinyl alcohol derivative can provide an aqueous suspension which is stable thermally, mechanically and chemically. Further, different from polyvinyl alcohols of the completely or partially saponified type or polyvinyl alcohols modified by carboxyl groups or the like, each high molecular substance (a) has low foaming property and excellent self-defoaming property so that it can overcome troubles caused by foams during dispersing work.

Each anionic water-soluble high molecular substance (b) useful in the present invention can also provide, over a wide pH range, stable aqueous solutions which are extremely light-colored.

As has been described above, each of the anionic water-soluble high molecular substances (a), (b) useful as dispersants in the present invention has extremely good dispersing ability for the color-developing composition comprising the multivalent-metal-modified salicylic acid resin, whereby the resulting aqueous suspension according to this invention is stable with high concentration and low viscosity. Moreover, the aqueous suspension is free from the problem of severe foaming tendency or difficulty in defoaming, which would arise if a conventional polyvinyl alcohol were employed.

Further, each anionic water-soluble high molecular substance (a) useful in the present invention is equipped not only with anionic properties but also with nonionic properties so that it has both excellent dispersing ability and excellent protective colloidal properties. The resulting aqueous suspensions, therefore, have far superior mechanical and thermal stability to aqueous suspensions prepared using other dispersants.

A description will next be made of a method for preparing the aqueous suspension of this invention from the anionic water-soluble high molecular substance (a) or (b) and the color-developing composition comprising the multivalent-metal-modified salicylic acid resin.

Since the anionic water-soluble high molecular substances (a) and (b) are each obtained generally as white powder readily soluble in water or an aqueous solution, they are each used in a form dissolved in water as needed. The pH of the solution is adjusted to a range of 4–10, preferably to a range of 6–9. Into the thus-prepared aqueous solution of the high molecular substance, powder of the color-developing composition comprising the multivalent-metal-modified salicylic acid resin is charged. After the resulting mixture is stirred into a slurry, the slurry is wet-ground with a spherical grinding medium to an average particle size of 1–20 $\mu$m in a wet-grinding apparatus, for example, a ball mill, attritor or sand grinder, whereby an aqueous suspension is obtained. Such wet-grinding can be conducted by a batchwise or continuous processing method. The slurry is ground until a desired particle size is attained. Where the color-developing composition comprising the multivalent-metal-modified salicylic acid resin has a low softening point and is readily liquefied at a temperature not higher than the boiling point of water, an aqueous suspension can be obtained by agitating the color-developing composition at a high speed in warm or hot water and then cooling the resultant emulsion.

No particular limitation is imposed on the amount of the anionic water-soluble high molecular substance (a) and/or (b) to be used in the present invention, because it varies depending on the substance (color-developing composition) to be dispersed and physical properties (concentration, particle size, viscosity, etc.) of the desired aqueous suspension. To obtain a practical aqueous suspension (average particle size: 1–10 $\mu$m), however, the anionic water-soluble high molecular substance (a) and/or (b) should be used in an amount of at least 0.5 parts by weight, preferably 2–30 parts by weight per 100 parts by weight of the color-developing composition comprising the multivalent-metal-modified salicylic resin. Incidentally, the concentration of the aqueous suspension may preferably be 30–80 wt. %. Although either. the anionic water-soluble high molecular substance (a) or the anionic water-soluble high molecular substance (b) can be used as a dispersant, it is preferable to use them in combination. Their combined use makes it possible to reduce the amount of the dispersant upon formation of the aqueous suspension compared with their single use, so that a more stable aqueous suspension can be obtained. Where the anionic water-soluble high molecular substances (a) and (b) are used in combination, an extremely-stable aqueous suspension can be obtained even when they are used in a total amount not greater than 10 parts by weight per 100 parts by weight of the color-developing composition. Another anionic or nonionic surfactant, water-soluble high molecular substance or the like can also be used in combination to adjust the viscosity and rheological characteristics of the aqueous suspension.

The average particle size of the color-developing composition, which comprises the multivalent-metal-modified salicylic acid resin, in the aqueous suspension is not greater than 10 $\mu$m, preferably in a range of 0.5–10 $\mu$m. If there are many particles greater than 10 $\mu$m, more sediment occurs during standstill storage of the aqueous suspension and the color-producing performance of pressure-sensitive copying paper sheets, especially the density of color marks immediately after their production are lowered. If there are many particles smaller than 0.5 $\mu$m, on the other hand, the resulting aqueous suspension has a higher viscosity, thereby making it difficult to increase the concentration and also to handle the aqueous suspension.

Upon fabrication of a pressure-sensitive copying paper sheet by using the aqueous suspension of this invention, an inorganic or organic pigment, a coating binder, a pigment dispersant, various other additives and the like are first mixed, followed by the preparation of a water-base coating formulation conforming with a coating method. The water-base coating formulation is to adjust the paper surface characteristics of the pressure-sensitive copying paper sheet. The water-base coating formulation is coated on a base material and then dried, so that the pressure-sensitive copying paper sheet is fabricated. Usable examples of the inorganic or organic pigment include kaolin, calcined kaolin, bentonite, talc, calcium carbonate, barium sulfate, aluminum oxide, silica, titanium white, titanium oxide, polystyrene emulsion, and urea resin emulsion. Illustrative usable coating binders include denatured starches such as oxidized starch, enzyme-converted starch, starch urea phosphate and alkylated starch; water-soluble proteins such as casein and gelatin; and synthetic or semisynthetic binders such as styrene-butadiene (SBR) latex, methyl methacrylate-α-butadiene (MBR) latex, vinyl acetate polymer emulsion, polyvinyl alcohol, carboxymethylcellulose, hydroxyethylcellulose and methylcellulose. Usable examples of the pigment dispersant include phosphoric acid salts such as sodium metaphosphate, sodium hexametaphosphate and sodium tripolyphosphate; and polycarboxylic acid salts such as sodium salt of polyacrylic acid. Usable examples of the various other additives include fluorescent brightening agents, defoaming agents, viscosity modifiers, dusting preventives, lubricants, and water-proofing agents.

A water-base coating formulation, which has been prepared by mixing and dispersing the aqueous suspension of this invention and the above-described various components, is coated on a base material such as a paper sheet or film by an air-knife coater, blade coater, brush coater, roll coater, bar coater, gravure coater or the like, and is dried to obtain a color-developing sheet for the pressure-sensitive copying paper sheet. In general, the coat weight of the water-base coating formulation is at least 0.5 g/m$^2$, preferably in a range of 1–10 g/m$^2$ in term of dry weight. Although the color producing performance of the sheet coated with the water-base coating formulation is governed primarily by the concentration of the color-developing composition, which comprises the multivalent-metal-modified salicylic acid resin, in the water-base coating formulation, coat weights greater than 10 g/m$^2$ are not effective for the improvement of the color-producing performance and are disadvantageous economically.

The suitability of the aqueous suspension of this invention for the fabrication of a pressure-sensitive copying paper sheet is observed specifically in the following matters. The aqueous suspension of this invention has less thickening tendency so that, upon coating a water-base coating formulation containing it as a principal component, the working efficiency is significantly improved. When the air-knife coating method which requires a low-viscosity coating formulation is used for coating the water-base coating formulation described above, foaming can be conveniently reduced to a significant extent during recirculation of the water-base coating formulation. Further, upon preparation of a water-base coating formulation for use in the fabrication of a pressure-sensitive copying paper sheet, the aqueous suspension of this invention does not exhibit thickening tendency (shock) when it is mixed with another component which is generally employed, for example, a white pigment such as kaolin clay, calcium carbonate, zinc oxide or aluminum oxide. In addition, the aqueous suspension has a high solid content and excellent thermal stability so that the water-base coating formulation making use of the aqueous suspension is excellent in thermal and mechanical stability. The water-base coating formulation can therefore be applied suitably to a coater which is employed to coat a water-base coating formulation of a high solid content, in particular, to a blade coater or roll coater.

The color-developing sheet for a pressure-sensitive copying paper sheet, said color-developing sheet having been fabricated using the aqueous suspension of the present invention, has comparable or better color-producing ability, has been significantly improved in yellowing tendency upon exposure to sunlight and is extremely advantageous in handling and storage, compared with color-developing sheets fabricated using an inorganic solid acid or p-phenylphenol novolak resin. In addition, it can provide improvements to the following disadvantages which a metal salt of a salicylic acid compound, a typical example of metal salts of aromatic carboxylic acids, has:

(a) insufficient compatibility with a nonvolatile oil containing a color former dissolved therein,
(b) slight solubility in water,
(c) fading of produced color marks under light, and
(d) high cost.

Compared with a color-developing sheet obtained using a conventional multivalent metal salt of a resinified salicylic acid, that using the aqueous suspension of the present invention has also been improved to significant extents in light fastness and long-term stability of produced color marks.

The present invention will hereinafter be described in detail by the following examples. Color-developing compositions according to this invention will be described first by Examples 1–4 and Comparative Examples 1–4, and aqueous suspensions of this invention will then be described by Examples 5–12 and Comparative Examples 5–8.

Measurements of the performance of each color-developing sheet for a pressure-sensitive copying paper sheet, said color-developing sheet employing a color-developing composition of this invention as a color-developing agent, were conducted in accordance with the following methods. Measurement results are collectively summarized in Table 1 and Table 2.

1. Color-producing speed and produced color density [conducted in air-conditioned rooms of 20° C., 65% RH unless otherwise specifically indicated as "color production at low temperature (5° C., 60% RH)"]

In the case of production of a blue color, a commercial blue-color producing CB-sheet containing Crystal Violet Lactone (CVL) as a principal pressure-sensitive dyestuff precursor ("NW-40T" trade name; product of Jujo Paper Co., Ltd.) was used. It was stacked with a sample color-developing sheet (CF-sheet) coated with a water-base coating formulation with their coated sides maintained in a contiguous relation. The thus-stacked pressure-sensitive copying paper was typed by a typewriter to produce the color.

The reflectance of the sample color-developing sheet was measured by a "Σ-80 Color Difference Meter" (trade name; manufactured by Tokyo Denshoku Kogyo K. K. The same color difference meter was also used in the subsequent measuring tests) twice, namely, 1 minutes and 30 seconds after the typing and 24 hours after the typing. The results are expressed in terms of Y value.

Y value is a value obtained in accordance with the double-field display method established by CIE (Commision Internationale de l'Eclairage). It is expressed by the following equation (the same definition also applies to Y values in the subsequent measuring test):

$$Y = K \int_{380}^{780} p(\lambda) y(\lambda) r(\lambda) d\lambda$$

$$K = 100 / \int_{380}^{780} p(\lambda) y(\lambda) d\lambda$$

where
  p(λ): distribution of standard light source.
  y(λ): color matching function in the double field.
  r(λ): spectral characteristics of each sample.
  Regarding p(λ) and y(λ), reference may be had to JIS Z 8722.

2. Light fastness of produced color marks

Each sample color-developing sheet with a color produced in the manner described above in Testing Method 1 was exposed for 2 hours (and for 4 hours) to light on a carbon arc fadeometer (manufactured by Suga Testing Machine Co., Ltd.). After the exposure, its reflectance was measured by the "Σ-80 Color Difference Meter". The results are expressed in terms of Y value.

The smaller the Y value and the smaller its difference from the Y value before the test, the less the fading by the light and the more preferable.

3. Long-term storage stability

After each sample color-developing sheet with a color produced in the manner described above in Testing Method 1 was posted on a wall in an office (lighted by a fluorescent lamp of 500 Lx) for 6 months, the reflectance was measured by the "Σ-80 Color Difference Meter". The results are expressed in terms of Y value.

4. Plasticizer resistance

DOP microcapsule coated paper sheets were prepared by forming microcapsules—which contained dioctyl phthalate (DOP) as a core substance, had an average capsule size of 5.0 μm, and were equipped with a melamine-formaldehyde resin capsule wall—and applying a coating formulation, to which a small amount of a starch-base binder had been added, by an air-knife coater on a wood free paper web to achieve a dry coat weight of 5 g/m² and then drying the thus-coated paper web. One of the DOP microcapsule coated paper sheets and the color-developing sheet with color marks produced above in Testing Method 1 were brought into a contiguous relation with their coated sides facing each other. They were thereafter caused to pass under a linear pressure of 100 kg/cm through a super calender roll, so that DOP was caused to penetrate uniformly into the colored surface.

One hour after the test, the reflectance of the color-developing sheet was measured by the "Σ-80 Color Difference Meter". The results are expressed in terms of Y value. The smaller the Y value and the smaller its difference from the Y value before the test, the better the plasticizer resistance of the produced color marks.

5. Waterproofness of produced color marks

Each sample color-developing sheet, which had been colored by Testing Method 1, was dipped for 2 hours in water. Density changes of the produced color marks were observed visually.

6. Yellowing property of color-developing sheets
(6-1) Yellowing by $NO_X$

Following JIS L-1055 (Testing Method for $NO_X$ Gas Fastness of Dyed Materials and Dyes), each sample color-developing sheet was stored for 1 hour in a closed vessel of an atmosphere of $NO_X$ occurred by the reaction of $NaNO_2$ (sodium nitrite) and $H_3PO_4$ (phosphoric acid). The degree of its yellowing was investigated.

Upon an elapsed time of 1 hour after completion of the test, the reflectance of the color-developing sheet was measured by the "Σ-80 Color Difference Meter". The measurement results are expressed in terms of WB value. The greater the WB value and the smaller its difference from the WB value before the test, the smaller the yellowing property in an $NO_X$ atmosphere.

(6-2) Yellowing by exposure to sunlight

Each sample color-developing sheet was exposed for 4 hours to light on the carbon arc fadeometer (manufactured by Suga Testing Machine Co., Ltd.). After the exposure, the reflectance of the sample color-developing sheet was measured by the "Σ-80 Color Difference Meter". The measurement results are expressed in terms of WB value. The greater the WB value and the smaller its difference from the WB value before the test, the smaller the yellowing property upon exposure to light.

EXAMPLE 1

[First-stage reaction (I)]

Charged in a glass-made reactor were 13.8 g (0.1 mole) of salicylic acid, 0.2 g of anhydrous zinc chloride and 30 ml of 1,2-dichloroethane. The contents were heated and maintained in a temperature range of from 70° C. to 80° C. while nitrogen gas was blown thereinto.

To the reactor, 49.2 g (0.35 mole) of α-methylbenzyl chloride were thereafter added dropwise from a dropping funnel over 5 hours. After the completion of the dropwise addition, the resulting solution was subjected to aging for 3 hours within the above temperature range, whereby the first stage reaction (I) was completed. The reaction mixture was condensed in a vacuum, whereby 49.6 g of a light yellow, clear resin were obtained. The resin so obtained had a weight-average molecular weight of 660. The resin (20 g; equivalent to 0.04 mole salicylic acid) obtained in the first-stage reaction (I) was molten in a temperature range of from 140° C. to 150° C. and, while being stirred, mixed with 30 g of polystyrene having a weight-average molecular weight of 5,000 and a softening point of 95° C.

[Second-stage reaction]

To the thus-molten mixture composition, the mixture consisting of 6.7 g of zinc benzoate and 4 g of ammonium bicarbonate was added gradually over 30 minutes. They were stirred continuously at the same temperature for additional 30 minutes so that a second-stage reaction was completed. The reaction mixture was discharged immediately and then cooled, whereby 55 g of a reddish brown, clear resin were obtained in a hard and fragile form. The resin had a softening point of 91° C.

[Use as a color-developing agent]

The zinc salt of a salicylic acid resin containing the above polymerized resin component was used as a color-developing agent. The color-developing agent was dispersed in a sand grinding mill in accordance with the following composition so that a suspension was prepared.

|  | Parts by weight |
|---|---|
| Color-developing agent | 6 |
| 10% Aq. soln. of polyvinyl alcohol ["Kuraray #117", trade name; product of KURARAY CO., LTD.] | 3 |
| Water | 22.5 |

Using the suspension, a coating formulation of the following composition was next prepared.

| Suspension | 10 |
|---|---|
| Light calcium carbonate | 10 |
| Starch | 0.8 |
| Synthetic rubber latex | 0.8 |
| Water | 32.5 |

The coating formulation was coated on a wood free paper web to give a dry coat weight of 5.0–5.5 g/m², followed by drying to obtain color-developing sheets.

EXAMPLE 2

Charged in a reactor were 440 g (1.1 moles) of a 10 wt. % aqueous solution of caustic soda, to which 126.0 g (1 mole) of benzyl chloride were added under stirring at 50° C. over 4 hours. The contents were heated to 100° C., at which they were reacted for 7 hours. After the completion of the reaction, the reaction mixture was cooled and allowed to stand so that the mixture separated into two layers. The lower water layer was removed, whereby the upper organic layer was obtained (yield: 105 g). As a result of an analysis by gas chromatography, the organic layer was found to have the following composition:

| | |
|---|---|
| Benzyl alcohol | 61.2 wt. % |
| Dibenzyl ether | 36.3 wt. % |
| Others | 2.5 wt. % |

The resultant benzyl compound was used in this example.

[First-stage reaction (I)]

Charged in a reactor were 27.6 g (0.2 mole) of salicylic acid, 105 g of the above-obtained benzyl compound and, as a catalyst, 0.8 g of zinc chloride. The contents were heated, while nitrogen gas was blown thereinto. The distillation of water started at 120° C. While water was distilled out of the system, the temperature was increased and maintained at 150° C. The reaction was conducted at the same temperature for 7 hours, whereby co-condensation was completed. After the completion, the reaction mixture was discharged, whereby 115 g of a resin were obtained. The resultant co-condensation resin had a weight-average molecular weight of 890.

To the resin, 38.3 g of polystyrene having a weight-average molecular weight of 5,000 were added and then mixed by heating and melting.

[Second-stage reaction]

A second-stage reaction was conducted in a similar manner to Example 1 except that 8.1 g (0.1 mole) of zinc oxide were added to the above-obtained mixed resin, whereby 158 g of a hard and fragile resin composition which had a softening point of 94.5° C. and contained as a main component the zinc salt of the salicylic acid resin were obtained.

[Use as a coloring-developing agent]

A color-developing sheet was obtained in a similar manner to Example 1 by using the above resin composition as a color-developing agent.

EXAMPLE 3

[First-stage reaction (I)]

Charged in a glass-made reactor were 13.8 g (0.1 mole) of salicylic acid, 0.2 g of anhydrous zinc chloride and 50 ml of 1,2-dichloroethane. The contents were heated under stirring and then maintained in a temperature range of from 70° C. to 80° C. To the reaction mixture, 28.1 g (0.2 mole) of α-methylbenzyl chloride were added dropwise from a dropping funnel over 3 hours. The resulting mixture was subjected to aging for 2 hours within the same temperature range, whereby a first-stage reaction (I) was completed.

[First-stage reaction (II)]

The reaction mixture obtained in the first-stage reaction (I) was cooled and maintained in a temperature range of from 0° C. to 5° C. To the reaction mixture, 3.5 g of 96% sulfuric acid were added. To the resulting mixture, 20.8 g (0.2 mole) of styrene were added dropwise over 5 hours under vigorous stirring. The reaction mixture was then subjected to aging for one hour within the same temperature range, whereby a first-stage reaction (II) was completed.

The reaction mixture was added with 50 ml of water and then neutralized with aqueous ammonia to pH 6. The resulting solution was allowed to stand to obtain an organic layer as a lower layer. While the organic layer was heated, the solvent of 1,2-dichloroethane was recovered therefrom under reduced pressure. It was found that the resin so obtained had a weight-average molecular weight of 650.

The salicylic acid resin (55 g) was then mixed with 37 g of polystyrene, which had a weight-average molecular weight of 5,000 and a softening point of 95° C., while they were heated and molten in a temperature range of from 140° C. to 150° C.

[Second-stage reaction]

A second-stage reaction was conducted by adding 4.1 g of zinc oxide to 92 g of the above-obtained molten resin mixture composition and mixing them in a molten state at 140°–145° C. for one hour under nitrogen stream. In the course of the reaction, the mixture turned from a turbid form to a clear form. After the completion of the reaction, the reaction mixture was discharged immediately and cooled, whereby a hard and fragile, pale-yellow, clear resin was obtained (stoichiometric yield). The resin had a softening point of 94° C.

[Use as a color-developing agent]

A color-developing sheet was obtained in a similar manner to Example 1 by using the above composition as a color-developing agent.

EXAMPLE 4 p-Toluene sulfonic acid (0.8 g) was charged in 10.8 g (0.1 mole) of benzyl alcohol. The contents were heated and reacted for two hours in a temperature range of 130°–150° C. while water produced was removed out of the system.

α-Methylstyrene (35.4 g, 0.3 mole) was then added to the reaction mixture, followed by aging to obtain a viscous resin. The resin so obtained was designated as Resin B and was used in combination with the zinc salt of a salicylic acid resin to be obtained by the process to be described next.

[First-stage reaction (I)]

Charged in a glass-made reactor, 13.8 g (0.1 mole) of salicylic acid, 0.2 g of anhydrous zinc chloride and 30 ml of 1,2-dichloroethane. The contents were heated and then maintained in a temperature range of from 70° C. to 80° C. while nitrogen gas was blown into the reactor.

Then, 46.4 g (0.3 mole) of p-methyl-α-methylbenzyl chloride were added dropwise to the reactor from the dropping funnel over 5 hours. After the completion of the dropwise addition, the resulting mixture was subjected to aging for 3 hours within the same temperature range, whereby a first-stage reaction (I) was completed. The reaction mixture was concentrated in a vacuum so that a pale yellow, clear resin was obtained.

[Second-stage reaction]

While being dispersed in a mixture consisting of 4.3 g of caustic soda and 500 g of water, the resin obtained in the first-stage reaction (I) was heated to 70° C. and was dissolved therein.

The resulting solution was thereafter cooled to 30° C., followed by the dropwise addition of a solution, which had been obtained by dissolving 15.8 g (0.055 mole) of zinc sulfate heptahydrate in 50 g of water in advance, over 30 minutes under stirring.

White precipitate appeared. After two-hour stirring at the same temperature, the precipitate was collected by filtration. The precipitate was washed with water and then dried, whereby 51.5 g of white powder were obtained. The thus-obtained zinc salt of the salicylic acid resin was mixed with Resin B, which had been prepared above, in a molten state under heat, whereby a color-developing agent was provided.

[Use as a color-developing agent]

A color-developing sheet was obtained in a similar manner to Example 1 by using, as a color-developing agent, the zinc salt of the salicylic acid resin containing the polycondensation resin component.

Comparative Example 1

Charged in a glass-made reactor were 170 g of p-phenylphenol, 22.5 g of 80% paraformaldehyde, 2.0 g of p-toluenesulfonic acid and 200 g of benzene. The contents were heated under stirring and while distilling out the resulting water as an azeotropic mixture with benzene from the reaction system, they were reacted at 70°–80° C. for 2 hours. After the completion of the reaction, 320 g of a 10% aqueous solution of sodium hydroxide were added to the reaction mixture. Benzene was then distilled out by steam distillation. The reaction mixture was cooled, followed by the dropwise addition of dilute sulfuric acid. A p-phenylphenol-formaldehyde polymer thus precipitated was collected by filtration, washed with water and then, dried, whereby 176 g of white powder were obtained.

A color-developing sheet was obtained in a similar manner to Example 1 by using the p-phenylphenol-formaldehyde polymer so obtained.

Comparative Example 2

A color-developing sheet was obtained in a similar manner to Example 1 by using the zinc salt of 3,5-di(α-methylbenzyl)salicylic acid.

Comparative Examples 3 and 4

The salicylic acid resin (20 g), which had been obtained in the first-stage reaction (I) of Example 1, was dispersed in a mixture consisting of 1.76 g of caustic soda and 300 g of water, and then dissolved in the latter under heat. The zinc salt of the salicylic acid resin (Resin A) was synthesized from the resulting solution in a similar manner to the second-stage reaction of Example 4 by using zinc sulfate heptahydrate.

Yield: 20.5 g

A color-developing sheet was obtained in a similar manner to Example 1 by using a portion of the zinc salt of the salicylic acid resin, as it was, as a color-developing agent (Comparative Example 3).

With 30 g of polystyrene having a weight-average molecular weight of 5,000, a 10 g portion of the remaining zinc salt of the salicylic acid was mixed in a molten state under heat.

The color-developing agent so obtained had a Resin A/Resin B weight ratio of 25/75. A color-developing sheet was obtained in a similar manner to Example 1 by using the color-developing agent (Comparative Example 4).

TABLE 2

| Example/ Comparative Example | Yellowing before test (WB value) | $NO_x$ yellowing (WB value) | Light yellowing (WB value) |
|---|---|---|---|
| Example 1 | 84.7 | 86.6 (2.1) | 83.4 (1.3) |
| Example 2 | 84.6 | 82.2 (2.4) | 81.1 (3.5) |
| Example 3 | 84.9 | 82.6 (2.3) | 83.6 (1.3) |
| Example 4 | 84.2 | 82.0 (2.2) | 82.1 (2.1) |
| Comp. Ex. 1 | 83.9 | 57.2 (26.7) | 71.9 (12.0) |
| Comp. Ex. 2 | 84.4 | 80.2 (4.2) | 79.2 (5.2) |
| Comp. Ex. 3 | 84.4 | 81.0 (3.4) | 80.0 (4.4) |
| Comp. Ex. 4 | 85.3 | 83.7 (1.6) | 83.9 (1.4) |

*Each value in parentheses is the difference between the WB value before test and that after the test.

Before describing examples of aqueous suspensions of this invention, various performance testing methods will be described next.

A) Properties of aqueous suspensions

Color hue

Four sheets, which have been produced by coating a wood free paper web with an aqueous suspension by a Mayer bar to give a dry coat weight of 5 g/m² (sheets coated with the aqueous suspension), were stacked one over another and measured by a "Σ-80 Color Difference Meter" (manufactured by Nippon Denshoku Kogyo K. K.). The measurement results are expressed in terms of a WB value.

A greater WB value indicates that the aqueous suspension is whiter. A difference in WB point as great as about 1 point or so makes it possible to visually determine superiority or inferiority.

Viscosity

After the solid content of an aqueous suspension obtained by wet-grinding is adjusted to 40 wt. %, the viscosity of the thus-adjusted suspension is measured by a Brookfield viscometer. The viscosity is expressed by a value so measured (measurement conditions: 25° C., No. 1 rotor, 60 rpm, unit: cps).

High-temperature storage stability

Two kilograms of an aqueous suspension were charged in a stainless beaker having an internal volume of 3 l. While the aqueous suspension was stirred at 100 rpm by a glass-made stirring blade (anchor type, 100 mm in diameter), the aqueous suspension was stored at 40° C. for 1 week. Its filterability before the storage and that after the storage were compared with each other in terms of the filtration time (sec) through a 200-mesh sieve of 7.5 cm in diameter.

In the case of a dispersion having poor high-temperature storage stability, the color-developing composition

TABLE 1

| | Performance of Color-Developing Sheet | | | | | | | |
|---|---|---|---|---|---|---|---|---|
| | Production of blue color (20° C., 65% RH) | | | | | | | Color production at low temperature (5° C., 60% RH) |
| | Produced color density (Y) | | Light fastness of produced color marks (Y) | | Long-term storage stability of | Plasticizer resistance of produced | Waterproofness of pro- | Produced color density (Y) |
| Example/ Comp. Ex. | 1.5 min later | 24 hrs later | Fadeometer 2 hrs. | Fadeometer 4 hrs. | produced color marks (Y) | color marks (Y) | duced color marks | 1.5 min later | 24 hrs later |
| Example 1 | 56.4 | 54.8 | 60.9 | 68.8 | 66.5 | 54.5 | Good | 59.5 | 55.7 |
| Example 2 | 58.2 | 56.1 | 64.2 | 72.9 | 68.5 | 55.4 | Good | 60.7 | 56.3 |
| Example 3 | 57.5 | 56.0 | 61.2 | 69.2 | 67.9 | 55.9 | Good | 59.0 | 56.8 |
| Example 4 | 57.9 | 56.0 | 61.7 | 70.4 | 68.8 | 56.3 | Good | 59.4 | 56.5 |
| Comp. Ex. 1 | 61.9 | 56.9 | 67.6 | 77.1 | 73.9 | 55.8 | Good | 65.4 | 57.8 |
| Comp. Ex. 2 | 59.5 | 56.1 | 64.4 | 73.6 | 72.3 | 59.5 | Disappeared | 70.5 | 57.6 |
| Comp. Ex. 3 | 59.1 | 56.2 | 63.2 | 71.5 | 68.3 | 57.2 | Good | 67.0 | 57.2 |
| Comp. Ex. 4 | 64.5 | 62.7 | 71.5 | 78.8 | 76.7 | 74.0 | Good | 66.2 | 63.1 | comprising the multivalent-metal-modified salicylic acid resin coagulates in the aqueous suspension, so that the filtering speed through a sieve drops as the particle size increases.

B) Properties of water-base coating formulations

Using the aqueous suspensions of the examples and comparative examples, water-base coating formulations (solid content: 50%) of the following composition were prepared and their properties were then measured.

| Component | Parts by weight (solid proportions) |
|---|---|
| (a) Aqueous suspension (as the color-developing composition comprising the multivalent-metal-modified salicylic acid resin in the suspension) | 18 |
| (b) Light calcium carbonate | 100 |
| (c) Styrene-butadiene latex | 6 |
| (d) Oxidized starch | 6 |
| (e) Poly(sodium acrylate) (pigment dispersant) | 0.5 |

Viscosity

Occurrence of an increase in viscosity was determined by a Brookfield viscometer (No. 3 rotor, 60 rpm). The preferred viscosity is in a range of 300–1000 cps.

Mechanical stability

Using each of the above-described water-base coating formulation having 50% solid content, the amount of a formed coagulum was measured by a Malone mechanical stability tester in accordance with JIS K-8392 (Testing Method for NBR Synthetic Latex) (measurement conditions: 100 g sample quantity, 1000 rpm, 10 min, 20 kg load). The amount so measured is used as an index for the mechanical stability of the water-base coating formulation. The water-base coating formulation was filtered through a 200-mesh sieve after the test and the amount of the coagulum (after absolute drying) was measured. The results are expressed in terms of percent coagulum formation (%).

A water-base coating formulation whose percent coagulum formation is found to have a large value by the above testing method tends to develop breakage of the dispersed state of the water-base coating formulation or a coating trouble due to coagulation or the like upon its high-speed coating which gives strong shear force, for example, when the water-base coating formulation is applied by the blade coating method or the gate roll coating method.

C) Performance as pressure-sensitive copying paper sheets

Each water-base coating formulation which had been employed in the above-described measurement of its mechanical stability by the Malone mechanical stability tester was coated by a Mayer bar on a wood free paper web to give a dry coat weight of 5 g/m$^2$, followed by drying to produce color-developing sheets.

Color-producing speed and produced color density (conducted in an air-conditioned room of 20° C., 65% RH)

A commercial blue-color producing CB-sheet containing Crystal Violet Lactone (CVL) as a principal pressure-sensitive dyestuff precursor ("N-40", trade name; product of Mitsubishi Paper Mills, Ltd) was used. It was combined with the above color-developing sheet. The thus-combined pressure-sensitive copying paper was typed by a typewriter to produce a color. The reflectance of the color-developing sheet was measured twice, namely, 105 seconds after the typing and 24 hours after the typing by the "Σ-80 Color Difference Meter". The results are expressed in terms of Y value.

Whiteness of color-developing sheets

Four of the above color-developing sheets were stacked one over another, and the reflectance was measured by the "Σ-80 Color Difference Meter". The results are expressed in terms of WB value.

A difference in WB point as great as about 1 point or so makes it possible to visually determine the whiteness of the color-developing sheets.

Yellowing by $NO_X$: in accordance with the method described in (6–1).

EXAMPLE 5

In an aqueous solution which had been obtained in advance by mixing 25 g of a 20% aqueous solution of polyvinyl alcohol (average polymerization degree: 300, saponification degree: 90%) having 5 mole % of sodium 2-acrylamido-2-methylpropanesulfonate units with 85 g of water and adjusting the pH of the resultant mixture to 8.0, 100 g of the fine resin powder obtained in Example 1 were charged. They were stirred into a slurry and then, processed for 2 hours with glass beads having a diameter of 1 mm in a sand grinder, whereby an aqueous white suspension (solid content: 50 wt. %) having an average particle size of 2.4 μm was obtained.

EXAMPLE 6

An ethylenesulfonic acid-vinyl acetate copolymer containing 3 mole % of ethylenesulfonic acid was saponified with caustic soda, whereby polyvinyl alcohol (average polymerization degree: 300) containing sulfonic acid groups and acetyl groups in amounts equivalent to 3 mole % and 1 mole %, respectively, was obtained. In an aqueous solution which had been obtained in advance by mixing 25 g of a 20% aqueous solution of the sulfonic-containing polyvinyl alcohol with 85 g of water and adjusting the pH of the resultant mixture to 8.4, 100 g of the fine resin powder obtained in Example 2 were charged. They were stirred into a slurry and then, processed for 2 hours in an attritor (manufactured by Mitsui Miike Seisakusho; zirconium medium of 5 mm in diameter) under water cooling, whereby an aqueous white suspension (solid content: 45 wt. %) having an average particle size of 2.1 μm was obtained.

EXAMPLE 7

Mixed with 85 g of water were 25 g of a 20% aqueous solution of sulfonated polyvinyl alcohol (containing sulfone groups and acetyl groups in amounts of 5 mole % and 10 mole %, respectively, based on the whole monomer units). The sulfonated polyvinyl alcohol had been obtained by adding polyvinyl alcohol to 80% sulfuric acid (maintained at 0° C.) to react them and then subjecting the reaction mixture to neutralization and purification. The resulting aqueous solution was heated to 90° C. The fine resin powder (100 g) obtained in Example 3 was charged in the resulting solution, followed by high-speed emulsification and dispersion in a homomixer (manufactured by Tokushu Kika Kogyo Co., Ltd.). The dispersion so obtained was cooled to room temperature, whereby an aqueous white suspension (solid content: 52 wt. %) having an average particle size of 2.0 μm was obtained

EXAMPLE 8

In an aqueous solution which had been obtained in advance by mixing 15 g of a 20% aqueous solution of polyvinyl alcohol (average polymerization degree: 250, saponification degree: 88%) containing 5 mole % of ethylenesulfonic acid units, 4.5 g of a 33% aqueous solution of the sodium salt of polystyrenesulfonic acid ("Caron 330I" trade name; product of Lion Corporation) and 109 g of water and adjusting the pH of the resultant mixture to 8.0, 100 g of the fine resin powder obtained in Example 4 were charged. They were stirred into a slurry and then, processed for 2 hours with glass beads having a diameter of 1 mm in a sand grinder, whereby an aqueous white suspension (solid content: 50 wt. %) having an average particle size of 2.1 μm was obtained.

EXAMPLE 9

In an aqueous solution which had been obtained in advance by mixing 25 g of a 20% aqueous solution of the sodium salt of polystyrenesulfonic acid (molecular weight: 10000, saponification degree: 70%) with 85 g of water and adjusting the pH of the resultant mixture to 8.0, 100 g of the fine resin powder obtained in Example 1 were charged. They were stirred into a slurry and then, processed with glass beads having a diameter of 1 mm in a sand grinder for 2 hours, whereby an aqueous white suspension (solid content: 50 wt. %) having an average particle size of 2.2 μm was obtained.

EXAMPLE 10

In an aqueous solution which had been obtained in advance by mixing 25 g of a 20% aqueous solution of ammonium polystyrenesulfonate salt ("Chemistadt 6500", trade name; product of Sanyo Chemical Industries, Ltd.) and 85 g of water and adjusting the pH of the resultant mixture to 8.0, 100 g of the fine resin powder obtained in Example 1 were charged. They were stirred into a slurry and then, processed with glass beads having a diameter of 1 mm in a sand grinder for 2 hours, whereby an aqueous white suspension (solid content: 50 wt. %) having an average particle size of 2.4 μm was obtained.

EXAMPLE 11

In an aqueous solution which had been obtained in advance by mixing 15 g of a 20% aqueous solution of polyvinyl alcohol (average polymerization degree: 250, saponification degree: 88%), which contained 5 mole % of ethylenesulfonic acid, and 5 g of a 30% aqueous solution of sodium salt of polystyrenesulfonic acid ("OKS-3376", trade name; product of The Nippon Synthetic Chemical Industry Co., Ltd.) with 89 g of water and adjusting the pH of the resultant mixture to 8.0, 100 g of the fine resin powder obtained in Example 2 were charged. They were stirred into a slurry and then, processed with glass beads having a diameter of 1 mm in a closed-type sand grinder (Dynomill) for 1.5 hours, whereby an aqueous white suspension (solid content: 50 wt. %) having an average particle size of 2.1 μm was obtained.

EXAMPLE 12

In an aqueous solution which had been obtained in advance by mixing 17 g of a 30% aqueous solution of the sodium salt of a sulfonated styrene-maleic acid copolymer ("SMA-1000", trade name; product of Arco Inc.) with 93 g of water and adjusting the pH of the resultant mixture to 8.0, 100 g of the fine resin powder obtained in Example 3 were charged. They were stirred into a slurry and then, processed with glass beads having a diameter of 1 mm in a sand grinder for 2 hours, whereby an aqueous white suspension (solid content: 50 wt. %) having an average particle size of 2.5 μm was obtained.

Comparative Example 5

Processing was conducted in a similar manner to Example 5 except for the replacement of sulfonic-containing polyvinyl alcohol by the sodium salt of a formaldehyde-naphthalenesulfonic acid condensation product. Dispersion was however impossible at 50% solid content. The suspension was hence diluted to 40% with water, whereby an aqueous white suspension having an average particle size of 3.1 μm was obtained.

Comparative Example 6

Processing was conducted in a similar manner to Example 5 except for the replacement of sulfonic containing polyvinyl alcohol by partially-saponified polyvinyl alcohol ("Poval 117", trade name; product of Kuraray Co., Ltd.). Because of intensive foaming and viscosity increase, the slurry so obtained became no longer dispersible in several tens minutes after the processing in the sand grinder was started. The solid content was diluted further with water to 40%, whereby an aqueous white suspension having an average particle size of 2.8 μm was obtained. After the completion of the processing, it took 24 hours until all the foams disappeared. The working efficiency was therefore extremely inferior.

Comparative Example 7

In an aqueous solution of 10 g of sodium lignin-sulfonate salt ("Ozan CD", trade name; product of ITT Reonior Inc.) in 134 g of water, 100 g of the fine resin powder obtained in Example 2 were dispersed, followed by the formation of a slurry. The slurry was treated in a sand grinder similarly to Example 5, whereby an aqueous brown suspension having an average particle size of 2.5 μm and a solid content of 45 wt. % was obtained.

Comparative Example 8

As a result of the processing in a similar manner to Example 5 except for the replacement of the sulfonic-containing polyvinyl alcohol by an equal amount of sodium salt of polycarboxylic acid ("Polystar OM", trade name; product of Nippon Oils & Fats Co , Ltd.), the slurry so obtained turned into a solid paste because of poor dispersion. Accordingly, no aqueous suspension was obtained.

The aqueous suspensions obtained in the above-described examples and comparative examples, water-base coating formulations prepared using the aqueous suspensions in accordance with the above-described method and pressure-sensitive copying paper sheets obtained by coating the water-base coating formulations were evaluated by the above-described testing methods, respectively. The results are summarized in Tables 3 and 4.

TABLE 3

Performance of Aqueous Suspension and Water-Base Coating Formulation

| | Properties of aqueous suspension | | | | | Properties of water-base coating formulation | |
|---|---|---|---|---|---|---|---|
| | Hue (reflectance) (%) | Viscosity (cps) | Filtering time (sec) | Storage stability at high temperatures (Change in particle size, μm) | | Viscosity (cps) | Amount of formed aggregates (%, as measured by Malone stability tester) |
| | | | | Before test | After test | | |
| Example 5 | 83.7 | 16.7 | 25 | 2.2 | 2.2 | 470 | 0.02 |
| Example 6 | 83.6 | 19.0 | 28 | 2.1 | 2.2 | 480 | 0.03 |
| Example 7 | 83.5 | 17.1 | 27 | 2.1 | 2.2 | 460 | 0.03 |
| Example 8 | 83.6 | 18.4 | 22 | 2.2 | 2.2 | 480 | 0.04 |
| Example 9 | 83.5 | 16.0 | 28 | 2.1 | 2.1 | 475 | 0.06 |
| Example 10 | 83.2 | 20.4 | 33 | 2.4 | 2.5 | 480 | 0.03 |
| Example 11 | 83.5 | 22.1 | 31 | 2.2 | 2.2 | 480 | 0.07 |
| Example 12 | 83.4 | 19.3 | 35 | 2.3 | 2.5 | 465 | 0.07 |
| Comp. Ex. 5 | 76.1 | 78.0 | 240 | 2.6 | 6.6 | 600 | 3.5 |
| Comp. Ex. 6 | 82.7 | 108 | 75 | 2.3 | 2.5 | 880 | 0.07 |
| Comp. Ex. 7 | 62.8 | 75.0 | 490 | 2.4 | 2.6 | 790 | 0.93 |
| Comp. Ex. 8 | — | — | — | — | — | — | — |

TABLE 4

| | Performance As pressure-sensitive copying paper | | |
|---|---|---|---|
| | Color-producing performance (reflectance) (Y) | | Whiteness of color-developing sheet (WB) | Yellowing Resistance to NOₓ (ΔL) |
| | Initial | Final | | |
| Example 5 | 54.8 | 53.6 | 83.0 | 2.9 |
| Example 6 | 55.2 | 53.9 | 83.2 | 2.5 |
| Example 7 | 55.1 | 53.2 | 83.3 | 2.8 |
| Example 8 | 55.1 | 53.5 | 83.5 | 2.3 |
| Example 9 | 54.8 | 53.9 | 83.2 | 2.1 |
| Example 10 | 54.9 | 53.5 | 83.4 | 2.5 |
| Example 11 | 55.9 | 54.1 | 83.8 | 2.9 |
| Example 12 | 54.8 | 53.7 | 83.6 | 2.7 |
| Comp. Ex. 5 | 56.1 | 54.2 | 79.5 | 13.3 |
| Comp. Ex. 6 | 58.3 | 54.9 | 83.5 | 2.9 |
| Comp. Ex. 7 | 55.5 | 53.9 | 78.8 | 19.9 |
| Comp. Ex. 8 | — | — | — | — |

As is apparent from Tables 3 and 4, it is understood that, because the present invention employs an anionic water-soluble high molecular substance of this invention as a dispersant upon obtaining an aqueous suspension of the color-developing composition, the aqueous suspension of the color-developing composition can be prepared with excellent features such as:

1) the suspension is colored less,
2) the color-developing composition is dispersed extremely stably so that the suspension produces less coagulum or precipitate even when stored at high temperatures over a long period of time,
3) viscosity increase and foaming are minimized during preparation of the aqueous suspension,
4) a resulting coating formulation for the fabrication of pressure-sensitive copying paper sheets has excellent thermal and mechanical stability, and
5) excellent pressure-sensitive copying paper sheets can be afforded, in which upon exposure to light or during storage, the dispersant itself is not yellowed so that the pressure-sensitive copying paper sheets are protected from quality deterioration.

We claim:

1. A color-developing composition comprising a multivalent-metal-modified salicylic acid resin (Resin A) and a polycondensation resin (resin B) free of any salicylic acid component at a weight ratio of 90–30 to 10–70, said Resin A being composed of 5–35 mole % of a structural unit (I) and 65–95 mole % of at least one structural unit (II) or 65–95 mole % of a coupled structural unit of at least one structural unit (II) and at least one structural unit (III) and said Resin A having a weight-average molecular weight of 350–5,000; said Resin B being composed of the structural unit (II) and/or the structural unit (III) and said Resin B having a weight-average molecular weight of 350–5,000; and said structural units (I), (II) and (III) being represented by the following formulae (I), (II) and (III), respectively:

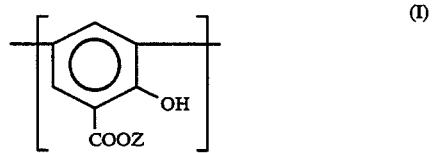

(I)

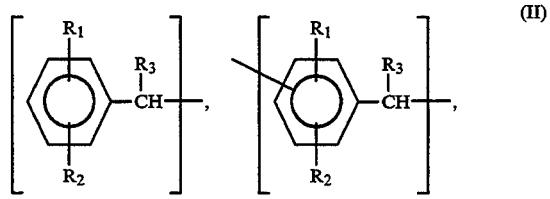

(II)

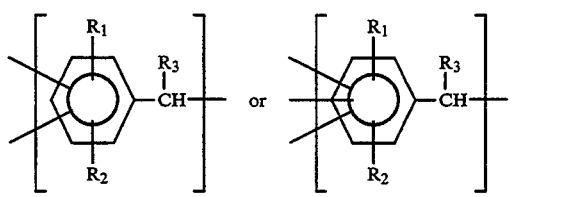

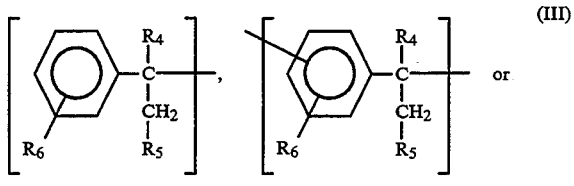

(III)

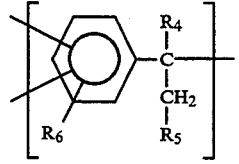

wherein Z represents M/m, M being a metal ion of m valence and m being an integer; $R_1$ and $R_2$ represent a hydrogen atom or a $C_{1-12}$ alkyl, aralkyl, aryl or cycloalkyl group; $R_3$ and $R_6$ represent a hydrogen atom or a $C_{1-4}$ alkyl group; and $R_4$ and $R_5$ represent a hydrogen atom or a methyl group.

2. The composition of claim 1, wherein the metal ion of the multivalent-metal-modified salicylic acid resin (resin A) is calcium, magnesium, aluminum, copper, zinc, tin, barium, cobalt or nickel.

3. The composition of claim 1, wherein the metal ion of the multivalent-metal-modified salicylic acid resin (resin A) is zinc.

4. The composition of claim 1, wherein the weight average molecular-weight of the multivalent-metal-modified salicylic acid resin (resin A) is 500–2,000.

5. The composition of claim 4, wherein the metal ion of the multivalent-metal-modified salicylic acid resin (resin A) is calcium, magnesium, aluminum, copper, zinc, tin, barium, cobalt or nickel.

6. The composition of claim 4, wherein the metal ion of the multivalent-metal-modified salicylic acid resin (resin A) is zinc.

7. An aqueous suspension of the color-developing composition of claim 1, prepared by finely wet-grinding the color-developing composition in the presence of at least one anionic, water-soluble, high molecular weight substance selected from the group consisting of:

a) polyvinyl alcohol derivatives containing at least one sulfonic acid group in the molecules thereof, and salts thereof, which derivatives are prepared by:

1) copolymerizing vinyl acetate and a sulfonic acid group-containing $\alpha,\beta$-unsaturated monomer and saponifying the product, 2) reacting a polyvinyl alcohol and concentrated sulfuric acid, 3) subjecting a polyvinyl alcohol to oxidative treatment and reacting the product with acidic sodium sulfite, or 4) reacting a polyvinyl alcohol with a sulfonic acid group-containing aldehyde compound in the presence of an acid catalyst to obtain a sulfoacetal; and b) a polymer or copolymer containing as an essential component a styrene sulfonic acid salt represented by the following formula (IV):

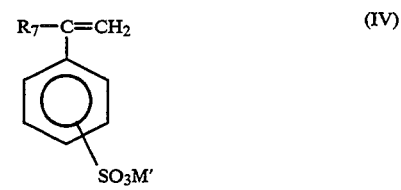

(IV)

wherein $R_7$ means a hydrogen atom or a $C_{1-5}$ alkyl group and M' denotes $Na^+$, $K^+$, $Cs^+$, $Fr^+$ or $NH_4^+$.

8. The aqueous suspension of claim 7, wherein the at least one anionic, water-soluble, high molecular weight substance is a polyvinyl alcohol derivative a) having a polymerization degree of 200–5000.

9. The aqueous suspension of claim 7, wherein the at least one anionic, water-soluble, high molecular weight substance is a polymer or copolymer b) having a polymerization degree of 5–1000.

* * * * *